(12) United States Patent
Joseph et al.

(10) Patent No.: US 8,957,909 B2
(45) Date of Patent: Feb. 17, 2015

(54) SYSTEM AND METHOD FOR COMPENSATING FOR DRIFT IN A DISPLAY OF A USER INTERFACE STATE

(75) Inventors: Benjamin E. Joseph, Oakland, CA (US); Ian Chen, Campbell, CA (US)

(73) Assignee: Sensor Platforms, Inc., Mountain View, CA (US)

( * ) Notice: Subject to any disclaimer, the term of this patent is extended or adjusted under 35 U.S.C. 154(b) by 667 days.

(21) Appl. No.: 13/165,690

(22) Filed: Jun. 21, 2011

(65) Prior Publication Data

US 2012/0086725 A1 Apr. 12, 2012

Related U.S. Application Data

(60) Provisional application No. 61/391,043, filed on Oct. 7, 2010.

(51) Int. Cl.
G09G 5/00 (2006.01)
G09G 5/08 (2006.01)
(Continued)

(52) U.S. Cl.
CPC ............ G06F 3/038 (2013.01); G06F 3/0346 (2013.01)
USPC ............. 345/619; 345/156; 345/157; 463/36; 463/39

(58) Field of Classification Search
CPC ......... A63F 13/06; A63F 13/10; A63F 13/02; A63F 2300/6045; A63F 2300/1012; A63F 2300/1062; A63F 2300/1043; A63F 2300/1037; A63F 2300/1025; A63F 13/12; A63F 2300/1031; A63F 2300/105; A63F 2300/1006; G06F 3/04812; G06F 3/04892; G06F 3/038; G06F 3/04845; G06F 2230/0333; G06F 3/0362; G06F 3/0383; G06F 1/1626; G06F 1/169; G06F 3/0236; G06F 1/1656; G06F 3/011; G06F 3/016; G06F 3/0338; G06F 3/03543; H04M 1/23; G05G 9/047

USPC .......................... 345/619, 163, 169, 156, 157; 463/36–39, 30–35; 715/858
See application file for complete search history.

(56) References Cited

U.S. PATENT DOCUMENTS 5,128,671 A 7/1992 Thomas, Jr.
5,645,077 A 7/1997 Foxlin
(Continued)

FOREIGN PATENT DOCUMENTS

EP 1762287 A2 3/2007
WO WO 2004/047011 A2 6/2004
(Continued)

OTHER PUBLICATIONS

Foxlin, "Intertial Head-Tracker Sensor Fusion by a Complementary Separate-Bias Kalman Filter,", IEEE, pp. 185-195, Mar. 1996.
(Continued)

*Primary Examiner* — Ulka Chauhan
*Assistant Examiner* — Sae Won Yoon
(74) *Attorney, Agent, or Firm* — Carr & Ferrell LLP

(57) ABSTRACT

A system, a non-transitory computer readable storage medium including instructions, and a method for adjusting a displayed user interface in accordance with a navigational state of a human interface device. For each measurement epoch, a base set of operations are performed, including: determining an unmodified user interface state in accordance with the navigational state, and generating current user interface data. Upon detecting an error introducing state, additional operations are performed, including: determining a modified user interface state; adjusting the current user interface data in accordance with the modified user interface state; and determining a user interface state error. Upon detecting an error compensating state, additional operations are performed, including: determining a compensation adjustment and adjusting the current user interface data and user interface state error in accordance with the compensation adjustment. The current user interface data enables a current user interface to be displayed.

25 Claims, 20 Drawing Sheets

(51) Int. Cl.
  *A63F 9/24* (2006.01)
  *A63F 13/00* (2014.01)
  *G06F 3/038* (2013.01)
  *G06F 3/0346* (2013.01)

(56) References Cited

U.S. PATENT DOCUMENTS

| | | |
|---|---|---|
| 5,757,360 A | 5/1998 | Nitta et al. |
| 5,819,206 A | 10/1998 | Horton et al. |
| 5,874,941 A | 2/1999 | Yamada |
| 6,072,467 A | 6/2000 | Walker |
| 6,157,894 A | 12/2000 | Hess et al. |
| 6,176,837 B1 | 1/2001 | Foxlin |
| 7,139,983 B2 | 11/2006 | Kelts |
| 7,158,118 B2 | 1/2007 | Liberty |
| 7,216,055 B1 | 5/2007 | Horton et al. |
| 7,262,760 B2 | 8/2007 | Liberty |
| 7,296,363 B2 | 11/2007 | Danisch et al. |
| 7,305,630 B2 | 12/2007 | Hullender et al. |
| 7,350,303 B2 | 4/2008 | Rock et al. |
| 7,414,611 B2 | 8/2008 | Liberty |
| 7,451,549 B1 | 11/2008 | Sodhi et al. |
| 7,647,185 B2 | 1/2010 | Tarassenko et al. |
| 7,815,508 B2* | 10/2010 | Dohta ............... 463/37 |
| 7,844,415 B1 | 11/2010 | Bryant et al. |
| 7,940,986 B2 | 5/2011 | Mekenkamp et al. |
| 7,978,178 B2 | 7/2011 | Pehlivan et al. |
| 8,184,100 B2 | 5/2012 | Lian et al. |
| 8,201,200 B2* | 6/2012 | Imai ............... 725/44 |
| 8,223,121 B2 | 7/2012 | Shaw et al. |
| 2002/0158815 A1 | 10/2002 | Zwern |
| 2003/0023192 A1 | 1/2003 | Foxlin |
| 2003/0107888 A1 | 6/2003 | Devlin et al. |
| 2005/0229117 A1 | 10/2005 | Hullender et al. |
| 2006/0033716 A1 | 2/2006 | Rosenberg et al. |
| 2006/0164384 A1 | 7/2006 | Smith et al. |
| 2006/0164386 A1 | 7/2006 | Smith et al. |
| 2006/0250358 A1 | 11/2006 | Wroblewski |
| 2007/0287911 A1 | 12/2007 | Haid et al. |
| 2008/0072234 A1 | 3/2008 | Myroup |
| 2008/0080789 A1* | 4/2008 | Marks et al. ............... 382/296 |
| 2008/0211768 A1 | 9/2008 | Breen et al. |
| 2008/0281555 A1 | 11/2008 | Godin et al. |
| 2008/0284729 A1* | 11/2008 | Kurtenbach et al. ......... 345/156 |
| 2009/0009471 A1 | 1/2009 | Yamamoto et al. |
| 2009/0040175 A1 | 2/2009 | Xu et al. |
| 2009/0048021 A1 | 2/2009 | Lian et al. |
| 2009/0153349 A1 | 6/2009 | Lin et al. |
| 2009/0326857 A1* | 12/2009 | Mathews et al. ............... 702/141 |
| 2010/0039381 A1 | 2/2010 | Cretella, Jr. et al. |
| 2010/0060573 A1 | 3/2010 | Moussavi |
| 2010/0095773 A1 | 4/2010 | Shaw et al. |
| 2010/0097316 A1 | 4/2010 | Shaw et al. |
| 2010/0110001 A1 | 5/2010 | Yamamoto |
| 2010/0123605 A1* | 5/2010 | Wilson ............... 341/20 |
| 2010/0123656 A1 | 5/2010 | Park et al. |
| 2010/0149341 A1 | 6/2010 | Marks et al. |
| 2010/0150404 A1* | 6/2010 | Marks et al. ............... 382/107 |
| 2010/0156786 A1 | 6/2010 | Kabasawa et al. |
| 2010/0157168 A1 | 6/2010 | Dunton et al. |
| 2010/0194879 A1 | 8/2010 | Pasveer et al. |
| 2010/0302145 A1* | 12/2010 | Langridge et al. ............. 345/157 |
| 2011/0163947 A1 | 7/2011 | Shaw et al. |
| 2011/0205156 A1 | 8/2011 | Gomez et al. |
| 2011/0242361 A1* | 10/2011 | Kuwahara et al. ......... 348/231.4 |

FOREIGN PATENT DOCUMENTS

| | | |
|---|---|---|
| WO | WO 2005/040991 A2 | 5/2005 |
| WO | WO 2005/108119 A2 | 11/2005 |
| WO | WO 2006/090197 A1 | 8/2006 |
| WO | WO 2009/093161 A1 | 7/2009 |
| WO | WO 2009/132920 A1 | 11/2009 |
| WO | WO 2009/156499 A1 | 12/2009 |

OTHER PUBLICATIONS

Foxlin et al., "Miniature 6-DOF Inertial System for Tracking HMDs," SPIE vol. 3362, Helmet and Head-Mounted Displays III, AeroSense 98, Orlando, Fl, Apr. 13-14, 1998, pp. 1-15.

Sensor Platforms Inc., International Search Report and Written Opinion, PCT/US2011/052185, Jan. 31, 2012, 10 pgs.

International Search Report and Written Opinion for PCT/US2009/067976 dated May 3, 2010, 9 pgs.

International Search Report and Written Opinion for PCT/US2009/060475 dated May 18, 2010, 9 pgs.

International Search Report and Written Opinion for PCT/US2011/020242 dated Apr. 12, 2011, 13 pgs.

Ang et al.., "Kalman Filtering for Real-Time Orientation Tracking of Handheld Microsurgical Instrument," Proceedings of 2004 IEEE/RSJ International Conference on Intelligent Robots and Systems, Sep. 28-Oct. 2, 2004, Sendai, Japan, pp. 2574-2580.

Simon, "Kalman Filtering," Embedded Systems Programming, Jun. 2001, pp. 72-79.

Sensor Platforms Inc., International Search Report and Written Opinion, PCT/US2012/020365, May 23, 2012, 10 pgs.

\* cited by examiner

900

SYSTEM AND METHOD FOR COMPENSATING FOR DRIFT IN A DISPLAY OF A USER INTERFACE STATE

RELATED APPLICATIONS

This application claims the benefit of U.S. Provisional Patent Application No. 61/391,043, filed Oct. 7, 2010, entitled "System and Method for Compensating for Drift in a Display of a User Interface State," which is incorporated herein by reference in its entirety.

This application is related to U.S. patent application Ser. No. 12/436,727 filed May 6, 2009, entitled "System and Method for Determining an Attitude of a Device Undergoing Dynamic Acceleration Using Kalman Filter," which application is incorporated by reference herein in its entirety.

This application is related to U.S. patent application Ser. No. 12/338,991 filed on Dec. 18, 2008, "System and Method for Determining an Attitude of a Device Undergoing Dynamic Acceleration," which application is incorporated by reference herein in its entirety.

This application is related to U.S. patent application Ser. No. 12/338,996 filed on Dec. 18, 2008, "Host System and Method for Determining an Attitude of a Device Undergoing Dynamic Acceleration," which application is incorporated by reference herein in its entirety.

TECHNICAL FIELD

The disclosed embodiments relate generally to adjusting a user interface in accordance with a navigational state of a human interface device.

BACKGROUND

A human interface device (e.g., a mouse, a trackball, etc.) may be used to interact with objects within a user interface. Some applications may need to know the navigational state (e.g., attitude and/or position) of the human interface device while the device is moving. One such example is an application that interfaces with a human interface device that may be freely moved in space (e.g., in one, two, or three dimensions of displacement and one, two or three dimensions of rotation or attitude) to position a cursor in a user interface, adjust a display of overlaid objects in an augmented reality application or select a portion of a virtual world for display to the user. While the human interface device is being moved around, error may be introduced such that the current mapping between the navigational state of the human interface device and the currently displayed state of the user interface is different from a default mapping between the navigational state of the human interface device and the currently displayed state of the user interface (e.g., while the human interface device is pointed directly at the center of a display or projected image, error may have been introduced that causes the currently displayed user interface to behave as if the human interface device were pointed slightly to the left/right and/or above/below the center of the display/projected image).

While a small amount of error in the mapping between the navigational state and the currently displayed user interface may not be noticeable to a user, if the error is uncorrected, error can accumulate over time and will eventually result in a noticeable drift of user interface state relative to the navigational state of the human interface device. This drift affects the ability of the user to interact with the user interface efficiently. However, correcting the error without regard to actions by the user (e.g., while the while the human interface device is stationary) can cause the user to experience a lack of control (e.g., because the user interface is changing without input from the user). Accordingly, it would be highly desirable to provide a way to correct errors and thereby reduce drift between the human interface device and the user interface.

SUMMARY

Some embodiments provide a method for adjusting a displayed user interface in accordance with a navigational state of a human interface device, for each measurement epoch, the method includes performing a base set of operations including determining an unmodified user interface state in accordance with the navigational state of the human interface device, and generating current user interface data enabling a current user interface to be displayed in accordance with the unmodified user interface state. The method further includes, upon detecting an error introducing state of the human interface device, performing the base set of operations and additional operations for each measurement epoch, the additional operations comprising: determining a modified user interface state; adjusting the current user interface data in accordance with the modified user interface state; and determining a user interface state error based on a difference between the modified user interface state and the unmodified user interface state. The method also includes, upon detecting an error compensating state of the human interface device, performing the base set of operations and additional operations for each measurement epoch, the additional operations comprising: determining a compensation adjustment in accordance with the unmodified user interface state and the user interface state error; adjusting the current user interface data in accordance with the compensation adjustment; and reducing the user interface state error in accordance with the compensation adjustment. Finally, the method includes performing an operation using the current user interface data so as to enable the current user interface to be displayed.

In accordance with some embodiments, the current user interface data includes cursor position data corresponding to a cursor position in the currently displayed user interface. In some embodiments, the cursor position data is selected from the group consisting of: data relating to a change in the cursor position between measurement epochs; data relating to a velocity associated with the change in the cursor position between measurement epochs; data relating to an absolute coordinate of the cursor position; and data relating to a relative coordinate of the cursor position.

In accordance with some embodiments, the current user interface data includes data corresponding to a location of one or more user interface objects overlaid on a dynamic background, where the dynamic background is a background that changes in accordance with changes in actual position and/or actual attitude of the human interface device. In some embodiments, the human interface device includes a camera, and the current user interface data includes data corresponding to a location of one or more user interface objects overlaid on a dynamic background, where the dynamic background is an image corresponding to camera data from the camera.

In accordance with some embodiments, the current user interface data includes data enabling selection of a portion of a larger user interface that is to be currently displayed to a user of the human interface device. In some embodiments, the larger user interface is a virtual world and the current user interface is a portion of the virtual world that is selected based on a simulated viewpoint of the user in the virtual world.

In accordance with some embodiments, a computer system (e.g., a human interface device or a host system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a human interface device or a host system) has stored therein instructions which when executed by one or more processors, cause a computer system (e.g., a human interface device or a host system) to perform the operations of any of the methods described above.

BRIEF DESCRIPTION OF THE DRAWINGS

Like reference numerals refer to corresponding parts throughout the drawings.

DESCRIPTION OF EMBODIMENTS

Exemplary Use Cases

Human interface devices that have a determinable multi-dimensional navigational state (e.g., one or more dimensions of displacement and/or one or more dimensions of rotation or attitude) are becoming increasingly common for providing user input for many different types of user interfaces. For example, such a human interface device may be used as a multi-dimensional pointer to control a pointer (e.g., a cursor) on a display of a personal computer, television, gaming system, etc. As another example, such a human interface device may be used to provide augmented reality views (e.g., by overlaying computer generated elements over a display of a view of the real world) that change in accordance with the navigational state of the human interface device so as to match up with a view of the real world that is detected on a camera attached to the human interface device. As yet another example, such a human interface device may be used to provide views of a virtual world (e.g., views of portions of a video game, computer generated simulation, etc.) that change in accordance with the navigational state of the human interface device so as to match up with a virtual viewpoint of the user based on the orientation of the device. In this document, the terms orientation, attitude and rotation are used interchangeably to refer to the orientation of a device or object with respect to a frame of reference.

In order to function properly (e.g., return results to the user that correspond to movements of the human interface device in predictable ways), these applications rely on a consistent and accurate mapping between the navigational state of the user interface and the displayed user interface (e.g., the same human interface device should always correspond to the same cursor position, augmented reality state or virtual world view). However, error can be introduced into any of these systems (e.g., due to navigational state detection error or error introduced while the state of the use interface is being controlled/modified so as to improve usability). It is advantageous to correct this error, so as to reduce drift between the state of the human interface device and the displayed user interface state. While specific use cases are described above and will be used to illustrate the general concepts described below, it should be understood that these examples are non-limiting examples and that the embodiments described herein would apply in an analogous manner to any human interface device that would benefit from reduced drift (e.g., a more accurate mapping between a navigational state of a human interface device and a displayed user interface state).

System Overview

Figure 1:
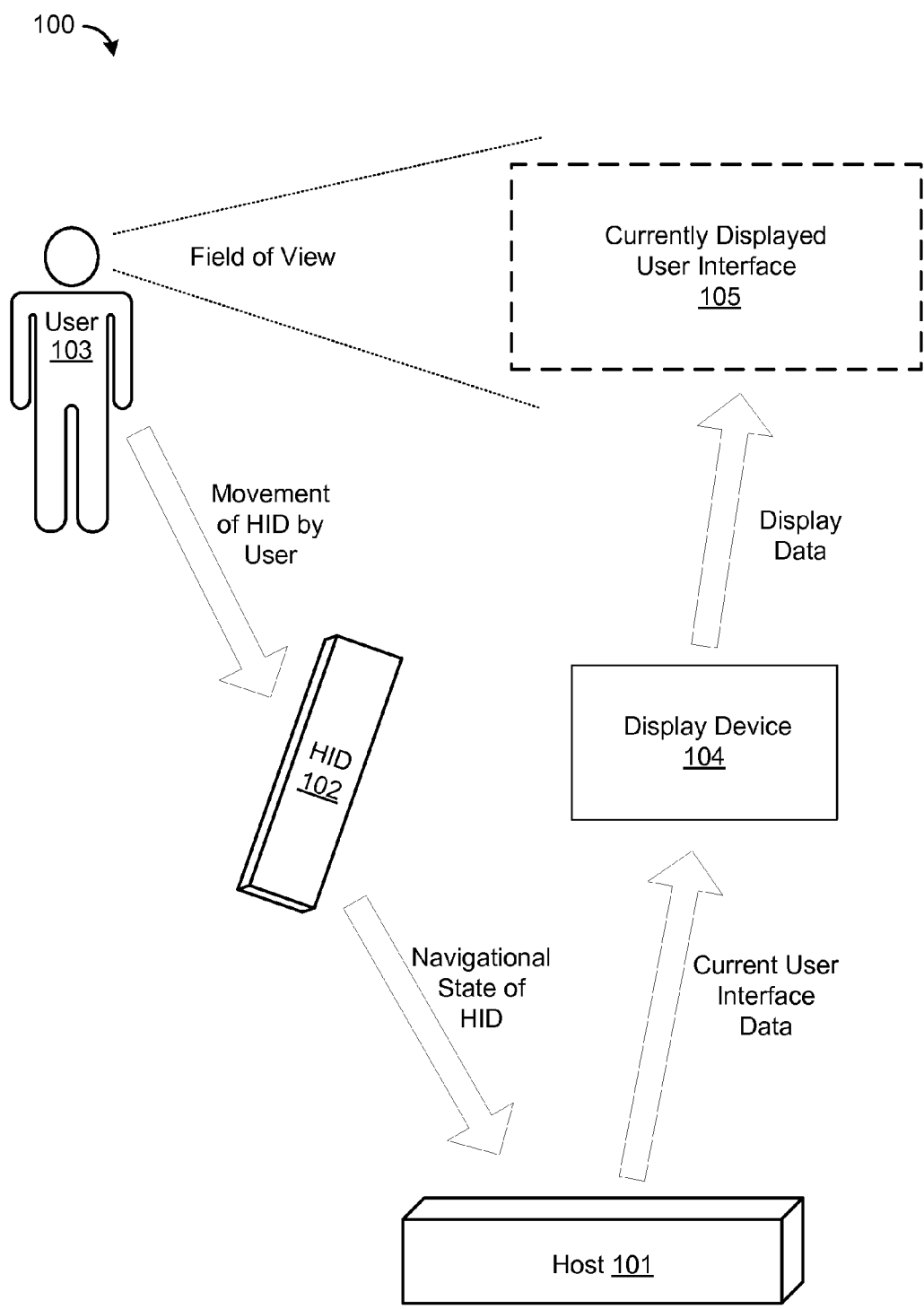
FIG. 1 illustrates a system for reducing drift, according to some embodiments.

Attention is now directed towards FIG. 1, which illustrate an exemplary system 100 for reducing drift. As shown in FIG. 1, an exemplary human interface device (HID) 102 is coupled to an exemplary host system 101 through a wireless interface, according to some embodiments. In these embodiments, a user 103 moves human interface device 102. These movements are detected by sensors in human interface device 102, as described in greater detail below with reference to FIG. 2. The human interface device 102, or host system 101, generates a navigational state of the human interface device based on sensor measurements from the sensors and transmits the navigational state to a host system 101. Host system 101 generates current user interface data based on the navigational state of the human interface device and transmits the current user interface data to a display device 104 (e.g., a display or a projector), which generates display data which is displayed to the user as the currently displayed user interface 105. While human interface device 102, host system 101 and display device 104 are shown in FIG. 1 as being separate, in some embodiments the functions of one or more of these elements are combined or rearranged, as described in greater detail below with reference to FIGS. 3A-3E.

Thus, the user can use human interface device 102 to issue commands for modifying the user interface, control objects in the user interface, and/or position objects in the user interface by moving human interface device 102 so as to change its navigational state. In some embodiments, human interface device 102 is sensitive to six degrees of freedom: displacement along the x-axis, displacement along the y-axis, displacement along the z-axis, yaw, pitch, and roll.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from human interface device 102 to host system 101. In some embodiments, the wireless interface is a bidirectional wireless interface. In some embodiments, bidirectional communication is used to perform handshaking and pairing operations. In some embodiments, a wired interface can be used instead of a wireless interface. As with the wireless interface, the wired interface may be a unidirectional or bidirectional wired interface.

In some embodiments, data corresponding to a navigational state of human interface device 102 (e.g., raw measurements, calculated attitude, correction factors, position information, etc.) is transmitted from human interface device 102 and received and processed on host system 101 (e.g., by a host side device driver). Host system 101 can then use this data to generate current user interface data (e.g., specifying a position of a cursor and/or other objects in a user interface).

Figure 2:
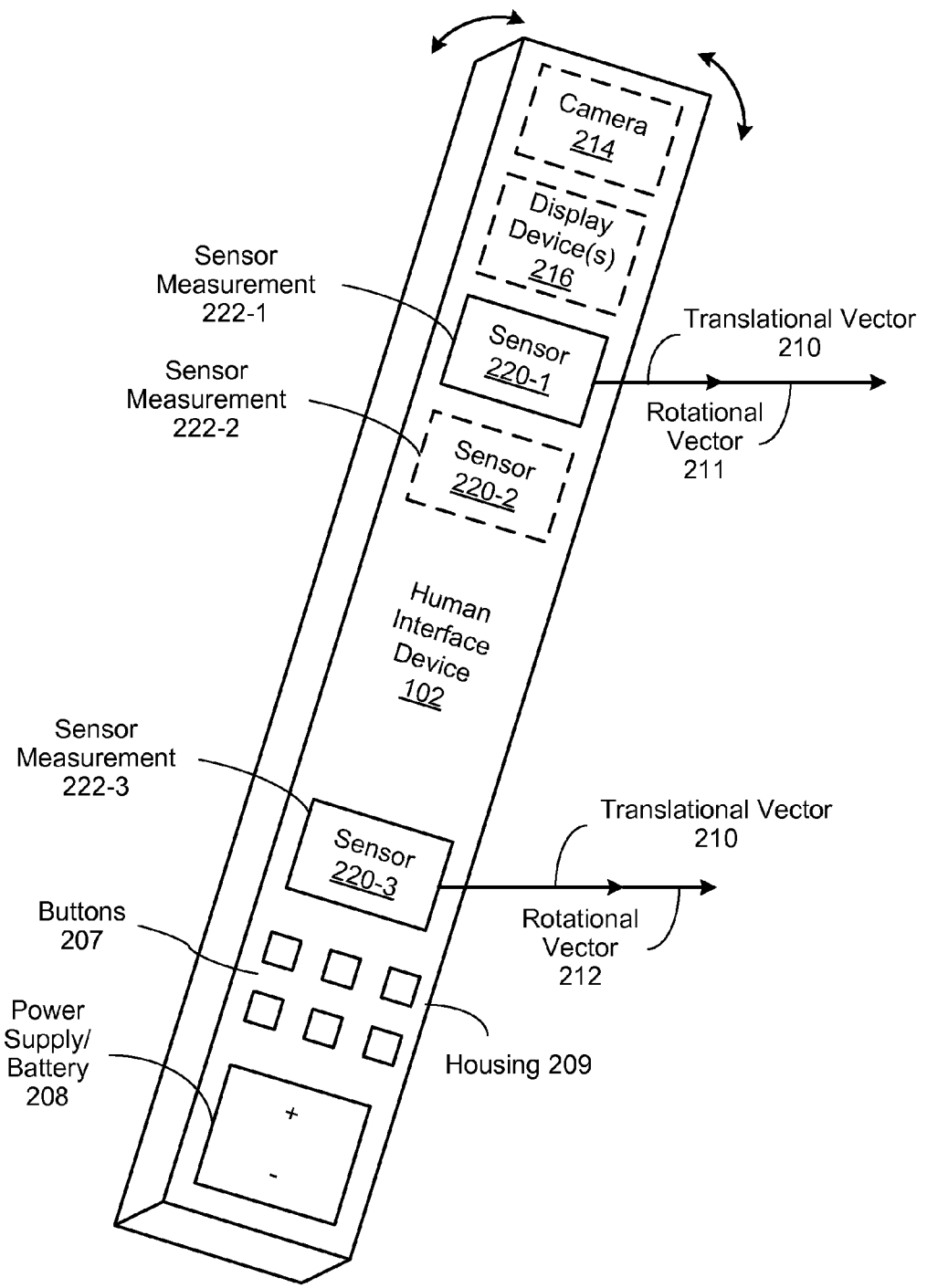
FIG. 2 is a block diagram illustrating an exemplary human interface device, according to some embodiments.

Attention is now directed towards FIG. 2, which illustrates an exemplary human interface device 102, according to some embodiments. In accordance with some embodiments, human interface device 102 includes one or more sensors 220 which produce sensor measurements 222, which can be used to determine a navigational state of human interface device 102 (e.g., two multi-dimensional accelerometers and a multi-dimensional magnetometer, as described in greater detail below with reference to FIG. 8). In some embodiments, the human interface device also includes buttons 207, a power supply/battery 208, a camera 214 and/or a display device 216 (e.g., a display or projector). In some embodiments, human interface device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of human interface device 102 (e.g., sensors 220, buttons 207, power supply 208, camera 214 and display device 216) are all enclosed in a housing 209 of human interface device 102.

It should be understood that many different types of sensors can be classified as either absolute sensors or relative sensors. As used herein, an absolute sensor is any sensor capable of providing information on the lowest order navigational state in the reference frame of interest. In other words, an absolute sensor is any sensor that can determine a navigational state of a device relative to a reference frame of interest (e.g., a set of stationary RF/magnetic/sonic beacons, a magnetic field, etc.) without requiring knowledge of a previous known navigational state of the device relative to the reference frame of interest.

In contrast, as used herein, a relative sensor is a sensor that provides a measurement of a change in navigational state relative to a previous navigational state. In other words, a relative sensor can be used to determine an amount of change of a quantity of interest (e.g., displacement, rotation, speed, acceleration, etc.) over time, however this change cannot be used to determine a navigational state of the human interface device relative to the reference frame of interest without a previous known navigational state relative to the reference frame of interest. In many situations it is advantageous (e.g., because it is less expensive, faster, more efficient, less computationally intensive, etc.) to use relative sensors to track change in the navigational state. However, relative sensors can accumulate a substantial amount of drift, which will persist until the sensors are recalibrated by identifying a known navigational state of the sensors in the reference frame of interest (e.g., by moving the user interface device to a known navigational state or using an absolute sensor to determine a navigational state of the human interface device.)

The drift reduction approaches described herein use the navigational state of the human interface device as input for determining current user interface data which is used to render the current user interface. As described in greater detail below, some combination of absolute and/or relative sensors is used to determine the navigational state of the human interface device. Typically, the human interface device includes one or more absolute sensors. However it should be understood that, in some embodiments (e.g., with sufficiently accurate relative sensors) the navigational state of a human interface device could be determined based on a known starting navigational state and input from only relative sensors.

However, in a more typical scenario, one or more absolute sensors will be used for at least a plurality of the determinations of the navigational states. Thus, in some embodiments, each determination of the navigational state will use a sensor measurement from an absolute sensor. In some embodiments, absolute sensor measurements are only received periodically (e.g., every 5 seconds or whenever the human interface device stops moving for more than a predefined threshold amount of time) and are used to determine absolute navigational states of the human interface device, and relative sensor measurements are used to determine relative navigational states of the human interface device using the last determined absolute navigational state of the human interface device as a known reference navigational state. Thus, in some embodiments, the human interface device includes one or more absolute sensors and one or more relative sensors.

In some embodiments the absolute sensor(s) include a multi-dimensional magnetometer and a multi-dimensional accelerometer (e.g., the frame of reference is the local magnetic field and gravity). In some embodiments the absolute sensor(s) include one or more camera sensors (e.g., the frame of reference is an infra-red light bar or other visual landmarks). In some embodiments the absolute sensor(s) include one or more magnetic beacon sensors (e.g., the frame of reference is one or more magnetic beacons). In some embodiments the absolute sensor(s) include one or more sonic beacon sensors (e.g., the frame of reference is one or more sonic beacons). In some embodiments the absolute sensor(s) include one or more radio-frequency beacon sensors (e.g., the frame of reference is one or more radio-frequency beacons).

In some embodiments the relative sensor(s) include an inertial measurement unit (e.g., a combination of an accelerometer, magnetometer and gyroscope that is used to determine relative position). In some embodiments the relative sensor(s) include a Doppler effect sensor, proximity sensor/switch, odometer, and/or one or more gyroscopes. In some embodiments the relative sensor(s) include one or more accelerometers.

Different combinations of sensors have different trade-offs in terms of price, accuracy, and sample rate. For some applications one particularly advantageous combination of sensors is a first multi-dimensional accelerometer, a second multi-dimensional accelerometer and a multi-dimensional magnetometer, as described in greater detail below. For some other applications one particularly advantageous combination of sensors is a gyroscope (e.g., a MEMS gyroscope), a multi-dimensional accelerometer and a camera (e.g., in combination with an infrared light bar).

Figure 11:
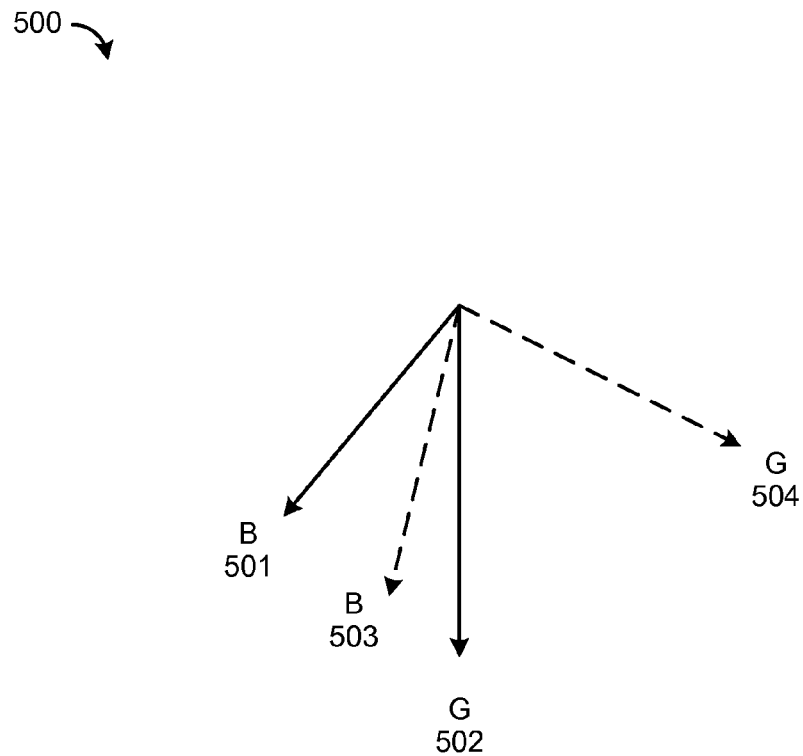
FIG. 11 is a diagram illustrating exemplary gravity and magnetic field vectors that can be used to determine attitude, according to some embodiments.

In some embodiments, the one or more processors (CPU(s) 1102, FIG. 11) of human interface device 102 perform one or more of the following operations: sampling sensor measurements 222, at a respective sampling rate, produced by sensors 220; processing sampled data to determine displacement; transmitting displacement information to host system 101; monitoring the battery voltage and alerting host system 101 when the charge of the battery is low; monitoring other user input devices (e.g., keypads, buttons, etc.), if any, on human interface device 102 and, as appropriate, transmitting information identifying user input device events (e.g., button presses) to host system 101; continuously or periodically running background processes to maintain or update calibration of sensors 220; providing feedback to the user as needed on the remote (e.g., via LEDs, etc.); and recognizing gestures performed by user movement of human interface device 102.

Attention is now directed towards FIGS. 3A-3E, which illustrate configurations of various components of the system for reducing drift, according to some embodiments. In some embodiments, there are three fundamental components to the system for reducing drift described herein: sensors 220, which provide sensor measurements that are used to determine a navigational state of the human interface device, user interface module 322 which uses the navigational state of the human interface device to determine current user interface data, and display device 104, which displays the currently displayed user interface to the user of the human interface device. It should be understood that these components can be distributed among any number of different devices. Additionally, for the purposes of the description in FIGS. 4, 5A-5E, the computer system performing the operations to compensate for user interface state error is the computer system (e.g., either the human interface device or the host system) that includes user interface module 322.

Figure 3A:
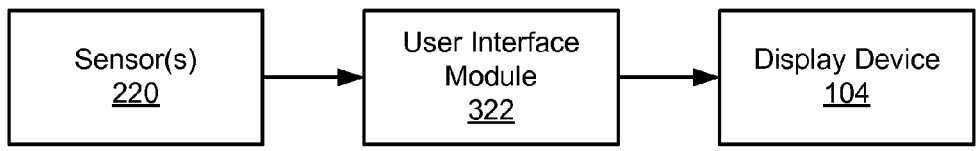
FIGS. 3A-3E are block diagrams illustrating configurations of various components of the system for reducing drift, according to some embodiments.
Figure 3B:
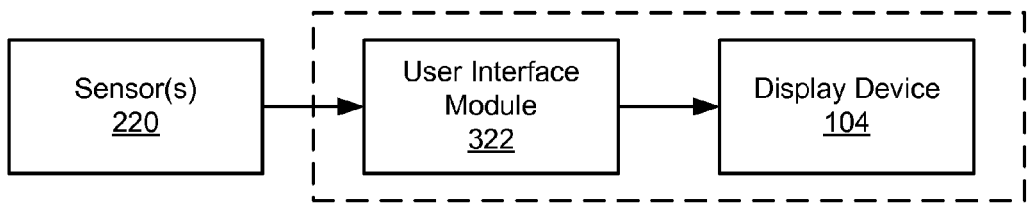
Figure 3C:
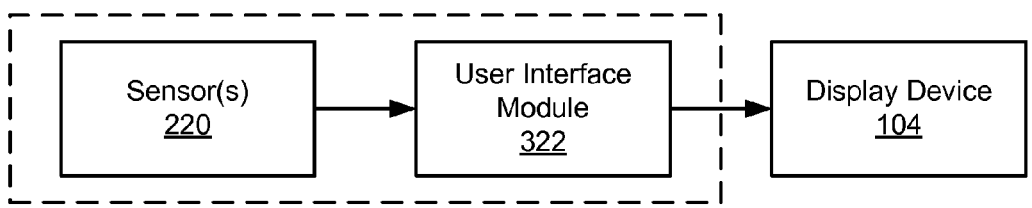
Figure 3D:
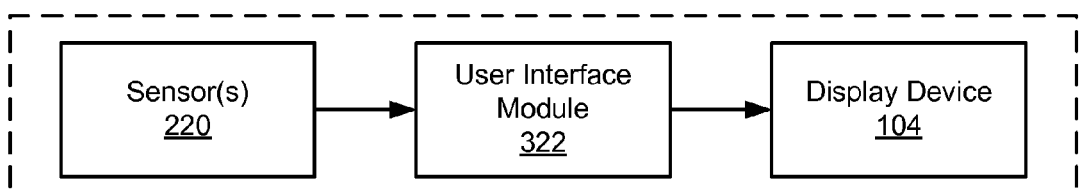
Figure 3E:
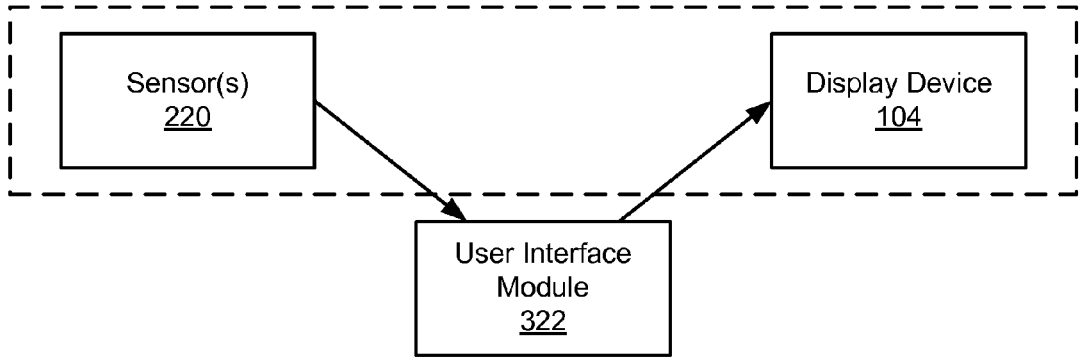

As one example, in FIG. 3A, sensors 220, user interface module 322 and display device 104 are distributed between three different devices (e.g., a human interface device, a set top box, and a television, respectively). As another example, in FIG. 3B, sensors 220 are included in a first device (e.g., a human interface device), while the user interface module 322 and display device 104 are included in a second device (e.g., a host with an integrated display). As another example, in FIG. 3C, sensors 220 and user interface module 322 are included in a first device (e.g., a "smart" human interface device), while display device 104 is included in a second device (e.g., a television). As yet another example, in FIG. 3D, sensors 220, user interface module 322 and display device 104 are included in a single device (e.g., a mobile computing device, such as a smart phone, personal digital assistant, tablet computer, etc., with an augmented reality application). As a final example, in FIG. 3E, sensors 220 and display device 104 are included in a first device (e.g., a game controller with a display/projector), while user interface module 322 is included in a second device (e.g., a game console/server). It should be understood that in the example shown in FIG. 3E, the first device will typically be a portable device with limited processing power, while the second device is a device (e.g., a host system) with the capability to perform more complex processing operations, or to perform processing operations at greater speed, and thus the computationally intensive calculations are offloaded from the portable device to the device with greater processing power. While a plurality of common examples have been described above, it should be understood that the embodiments described herein are not limited to the examples described above, and other distributions of the various components could be made without departing from the scope of the described embodiments.

Reducing Drift

As mentioned above, movement of human interface device 102 causes changes to the navigational state of the human interface device. These changes are detectable using many different combinations of sensors. For the sake of simplicity and so as not to unnecessarily obscure relevant aspects of the disclosed embodiments, for the description of FIGS. 1, 2, 3A-3E, 4 and 5A-5E, it will be assumed that the human interface device includes sensors that are capable of producing measurements that are sufficient to identify a navigational state (e.g., position and/or attitude) of the human interface device relative to a known frame of reference with precision that is above a predefined threshold. While the precision with which the navigational state of the human interface device can be determined is important for reducing drift, it should be understood that increasing the precision with which the navigational state of the human interface device can be determined does not, in and of itself, reduce the drift of the navigational state of the device relative to the user interface. In other words, identifying the navigational state of the human interface device with a precision above the predefined threshold is a necessary but not sufficient condition for reducing the drift. As used herein, this "drift" is referred to as "user interface state error." More specifically, "user interface state error" does not refer to the degree of precision of the determination of the navigational state relative to the reference frame, but rather the degree to which the mapping between the navigational state and the user interface state has drifted from the default mapping between the navigational state and the user interface state.

Moreover, it should be understood that the problem of identifying the navigational state of the human interface device relative to a known frame of reference with a precision that is above the predefined threshold is a non-trivial problem. While one solution (e.g., using a plurality of multi-dimensional accelerometers in conjunction with one or more multi-dimensional magnetometers to determine an attitude of the human interface device) to this problem is described below with reference to FIGS. 8-16, it should be understood that any approach that enables the determination of a navigational state of a human interface device with a precision that is above the predefined threshold could be used in conjunction with the drift reduction approaches described below with respect to FIGS. 4 and 5A-5E.

Figure 4:
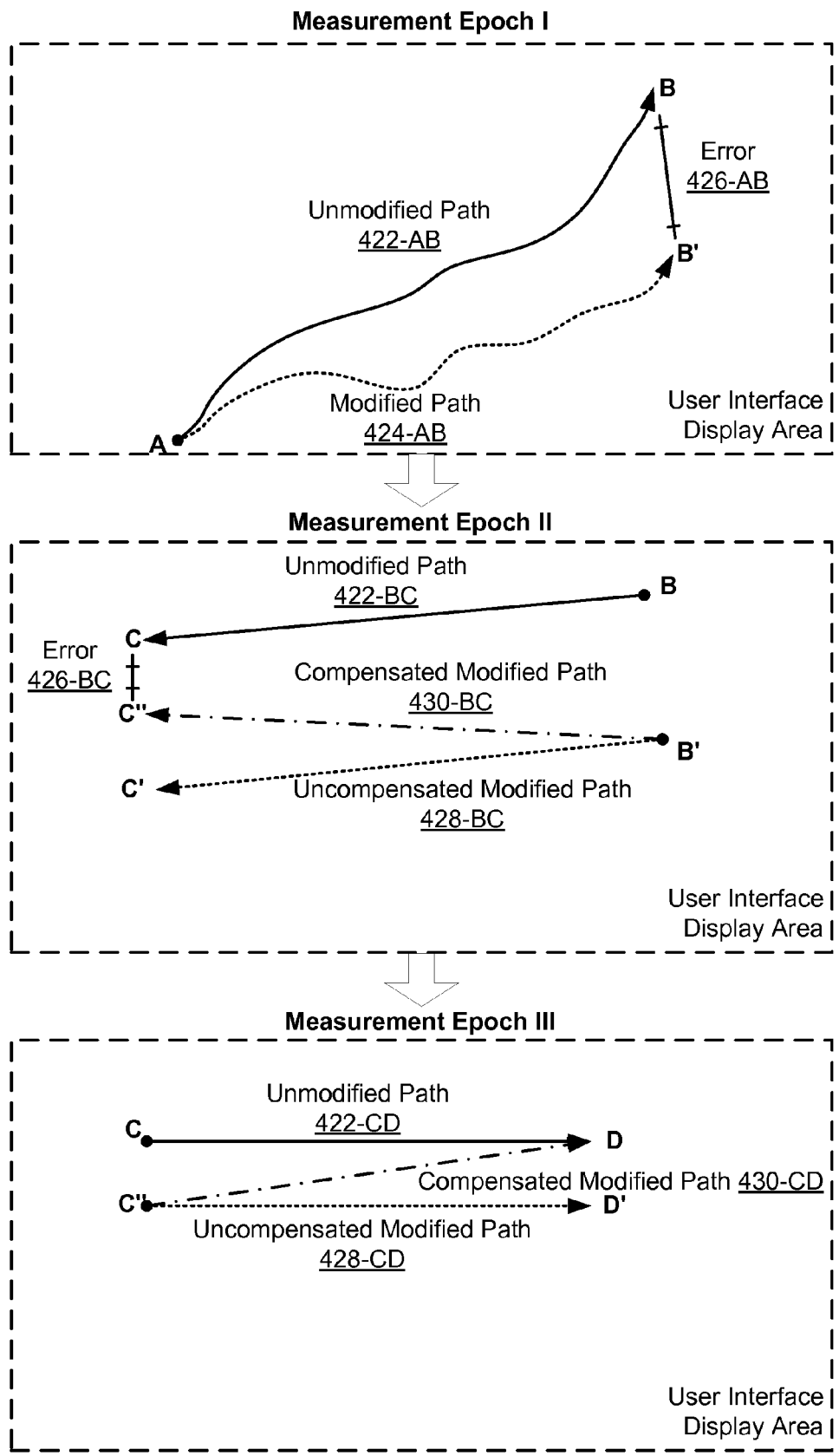
FIG. 4 is a diagram illustrating an example of drift and the reduction of drift, according to some embodiments.

Attention is now directed to FIG. 4, which illustrates an example of drift and the reduction of drift, according to some embodiments. For the sake of simplicity the following explanation is given using an example where the navigational state of the human interface device is converted into a cursor position. However, it should be understood that the general principles of reducing drift/compensating for user interface state error are applicable to a broad range of embodiments, as described in greater detail below with reference to FIGS. 5A-5E.

Prior to the first measurement epoch, the cursor starts at point A and there is no user interface state error.

In a first measurement epoch (or in a first sequence of measurement epochs), the computer system detects a change in the navigational state of the human interface device that corresponds to movement of a cursor. The unmodified path 422-AB corresponds to the movement of the cursor (e.g., from point A to point B) that would have occurred without the introduction of any user interface state error. However, in the first epoch, the computer system detects an error introducing state (e.g., a button press input which may cause unintended shaking of the human interface device) and thus user interface state error 426-AB is introduced (e.g., either as a result of the application of heuristics to suppress jitter resulting from unintended movement of the human interface device or some navigational state estimation error). Consequently, the cursor actually moves along a modified path 424-AB. As a result, the cursor moves from point A to point B' instead of point B.

In a second measurement epoch (or in a second sequence of measurement epochs), the computer system detects a change in the navigational state of the human interface device that corresponds to movement of a cursor. The unmodified path 422-BC corresponds to the movement of the cursor (e.g., from point B to point C) that would have occurred without the introduction of any user interface state error. Without any other changes (e.g., if the error was not compensated for and the cursor was simply moved in accordance with the movement of the human interface device) the cursor would be moved along the uncompensated modified path 428-BC from point B' to point C'. However, movement along the uncompensated modified path 428-BC would result in maintaining the user interface state error from the previous epoch. Instead, using any of the presently described embodiments, the computer system determines that error existed at the beginning of the second epoch and thus detects an error compensating state in the second epoch. Consequently, the computer system compensates for the error by adjusting the modified path to move the cursor along the compensated modified path 430-BC. As a result, the cursor moves from point B' to point C" instead of point C'.

In a third measurement epoch (or in a third sequence of measurement epochs), the computer system detects a change in the navigational state of the human interface device that corresponds to movement of a cursor. The unmodified path 422-CD corresponds to the movement of the cursor (e.g., from point C to point D) that would have occurred without the introduction of any user interface state error. Without any other changes (e.g., if the error was not compensated for and the cursor was simply moved in accordance with the movement of the human interface device) the cursor would be moved along the uncompensated modified path 428-CD from point C" to point D'. However, movement along the uncompensated modified path 428-CD would result in maintaining the user interface state error from the previous epoch. However, using the presently described embodiments, the computer system determines that error existed at the beginning of the third epoch and thus detects an error compensating state in the third epoch. Consequently, the computer system compensates for the error by adjusting the modified path to move the cursor along the compensated modified path 430-CD. As a result, the cursor moves from point C" to point D instead of point D'.

Thus, as shown in FIG. 4, over the course of one or more epochs (typically, over a sequence of multiple epochs), the computer system makes adjustments to the position of the cursor, so as to reduce the user interface state error. While in the preceding example, the user interface state error was introduced in one epoch and reduced in the subsequent epochs, it should be understood that additional user interface state error could be introduced in any of the epochs (e.g., concurrently with the error compensation operations). Similarly, the adjustments made to the cursor position could be made over any number of epochs.

Attention is now directed towards FIGS. 5A-5E, which illustrated a method for adjusting a displayed user interface in accordance with a navigational state of a human interface device. The method is performed at a computer system (e.g., human interface device 102 or host system 101) including one or more processors and memory storing one or more programs, the one or more processors executing the one or more programs to perform one or more of the operations described below. In accordance with some embodiments, the operations described below are performed at human interface device 102 (e.g., the computer system is human interface device 102), while in accordance with some other embodiments, the operations described below are performed at host system 101 (e.g., the computer system is host system 101). Additionally, in some embodiments, one or more of the operations described below are performed at human interface device 102 while one or more of the operations described below are performed at host system 101. Furthermore, as noted above, in some embodiments the computer system performing the illustrated method includes both human interface device 102 and host system 101.

For each measurement epoch, the computer system performs a base set of operations. In some embodiments, upon or after the beginning of a measurement epoch (506), the computer system acquires (508) one or more sensor inputs from sensors on the human interface device (e.g., a plurality of multi-dimensional accelerometer measurements and a multi-dimensional magnetometer measurement). In some embodiments, the computer system calculates (510) the navigational state of the human interface device, in accordance with the acquired sensor inputs, as the human interface device is moved by a user. In some embodiments, calculating the navigational state of the human interface device includes (512) calculating an attitude (e.g., roll, pitch and yaw) and/or a position (e.g., location on a x-axis, location on a y-axis, and location on a z-axis) of the human interface device relative to a reference frame.

In some embodiments, the attitude of the human interface device is calculated (515) using a Kalman filter, as described in greater detail below with reference to FIGS. 13-16. In some embodiments, calculating the attitude of the human interface device includes calculating (516) a difference between a first accelerometer measurement received from a first multi-dimensional accelerometer of the human interface device and a second accelerometer measurement received from a second multi-dimensional accelerometer of the human interface device; adjusting (518) a Kalman gain based on the difference, where the Kalman gain is used in a Kalman filter that determines the attitude of the human interface device; and calculating (520) the attitude of the human interface device using the Kalman filter based at least in part on the Kalman gain, the first accelerometer measurement, the second accelerometer measurement, and a magnetic field measurement received from a multi-dimensional magnetometer of the human interface device, as described in greater detail below with reference to FIGS. 13-16.

For each measurement epoch, the computer system also determines (522) an unmodified user interface state in accordance with the navigational state of the human interface device and generates (524) current user interface data enabling a current user interface to be displayed in accordance with the unmodified user interface state. In some embodiments, the unmodified user interface state is a state of the user interface that is displayed when there is no drift between the navigational state of the human interface device and the user interface. For example, when the human interface device is pointed directly at a center of the user interface, the cursor appears in the center of the user interface.

In some embodiments, the current user interface data includes (526) cursor position data corresponding to a cursor position in the currently displayed user interface (e.g., the human interface device has a primary axis, and the cursor position information indicates that the cursor is to be displayed at a location on the display where the primary axis would intersect with the currently displayed user interface). In some embodiments, the cursor position data is (528) data relating to a change in the cursor position between measurement epochs (e.g., move the cursor 20 pixels to the left and 10 pixels upward). In some embodiments, the cursor position data is (530) data relating to a velocity associated with the change in the cursor position between measurement epochs (e.g., move the cursor to the right at 20 pixels per second). In some embodiments, the cursor position data is (532) data relating to an absolute coordinate of the cursor position (e.g., move the cursor to row 15, column 34 of the display). In some embodiments, the cursor position data is (534) data relating to a relative coordinate of the cursor position (e.g., move the cursor to row 15, column 34 where the current cursor position is defined as row 1, column 1).

In some embodiments, the current user interface data includes (536) data corresponding to a location of one or more user interface objects overlaid on a dynamic background, and the dynamic background is a background that changes in accordance with changes in actual position and/or actual attitude of the human interface device. It should be understood that the "actual position" of the human interface device is the actual physical position of the human interface device and that the "actual attitude" of the human interface device is the actual physical orientation of the human interface device. In contrast the navigational state of the human interface device is a value that is calculated based on sensor measurements. Thus, a camera that is rigidly attached to the human interface device would provide images that change in accordance with the actual attitude/position of the human interface device (e.g., by providing images of whatever is in front of the camera, which varies depending on the actual attitude/position of the human interface device in the actual physical world). Thus, in some embodiments, the human interface device includes a camera, and the current user interface data includes (538) data corresponding to a location of one or more user interface objects overlaid on a dynamic background, where the dynamic background is an image corresponding to camera data from the camera. In other words, in some embodiments, the dynamic background is a camera output from a camera that is rigidly attached to the human interface device and thus displays an image that corresponds to the position/attitude of the human interface device, as opposed to the calculated navigational state of the human interface device.

One example of this embodiment is the overlaying of computer generated graphics (e.g., user interface objects) over an image/video of the real world, also known as "augmented reality" or "modified reality." For some augmented reality applications, it is important that the user interface objects overlaid over the image/video be maintained in the same location relative to the real world, so that the user interface objects are displayed proximate to the real world features that they are intended to augment (e.g., a text description of a building or geographic feature should be located proximate to the described building or geographic feature). However, user interface state error (e.g., drift) causes the user interface objects to be displayed at unintended locations, which severely limits the usefulness of the augmented reality application (e.g., the description of building A is shifted so that it appears proximate to building B, misleading the user into believing that the description relates to building B). Consequently, reducing the drift by compensating for the user interface state error, as described below, provides substantial advantages for augmented reality applications.

In some embodiments, the current user interface data includes (540) data enabling selection of a portion of a larger user interface that is to be currently displayed to a user of the human interface device. In other words, the current user interface is the portion of the larger user interface that is to be currently displayed. In some embodiments, the larger user interface is (542) a virtual world and the current user interface is a portion of the virtual world that is selected based on a simulated viewpoint of the user in the virtual world. As one example, the currently displayed user interface is a portion of the user interface having a predefined shape that is projected from the human interface device and shows a portion of a virtual world (e.g., a flashlight shining in a virtual world, where only the portion of the virtual world that is "illuminated" by the flashlight is displayed as the currently displayed user interface).

As another example, the user is playing a video game such as a "first person shooter" type video game, where the video game virtual world is surrounding the user, and a projector on the human interface device projects a display of the portion of the video game virtual world that is in front of a predefined end of the human interface device (which would typically represent a muzzle of a gun in the video game). Thus, the user is able to move the human interface device to see different parts of the video game virtual world and "shoot" at objects in the video game virtual world using the human interface device. A key element of providing a realistic experience is making sure that the virtual world stays in a fixed location relative to the real world. However, user interface state error (e.g., drift) can cause the virtual world to shift. For example, if a dramatic amount of drift has occurred (e.g., 45 degrees of drift), even though the human interface device is pointed due north, due to drift, the currently displayed user interface shows the portion of the video game world that should be displayed when the human interface device is pointed due northeast). While this is an extreme example, even much smaller amounts of drift (as little as 1 to 2 degrees) may adversely affect game play, causing features of the virtual world to appear in different portions of the real world depending on the amount of drift. Consequently, reducing the drift by compensating for the user interface state error, as described below, provides substantial advantages for virtual world applications.

As described previously, the computer system may detect any of a plurality of states of the human interface device, including an error introducing state of the human interface device (e.g., a state where a modified state of the user interface is determined that results in a user interface state error between the modified user interface state and an unmodified user interface state), and an error compensating state of the human interface device (e.g., a state where the user interface state error is to be reduced). It should be understood that at least the error introducing state and the error compensating state are typically orthogonal. In other words, whether the error introducing state has been detected in a current measurement epoch has no effect on whether the error compensating state will be detected in the current measurement epoch. Thus, in some circumstances neither the error introducing state nor the error compensating state is detected; while in other circumstances the error introducing state is detected without detecting the error compensating state or the error compensating state is detected without detecting the error introducing state; and finally, in some circumstances both the error introducing state and the error compensating state are detected concurrently.

Figure 5A:
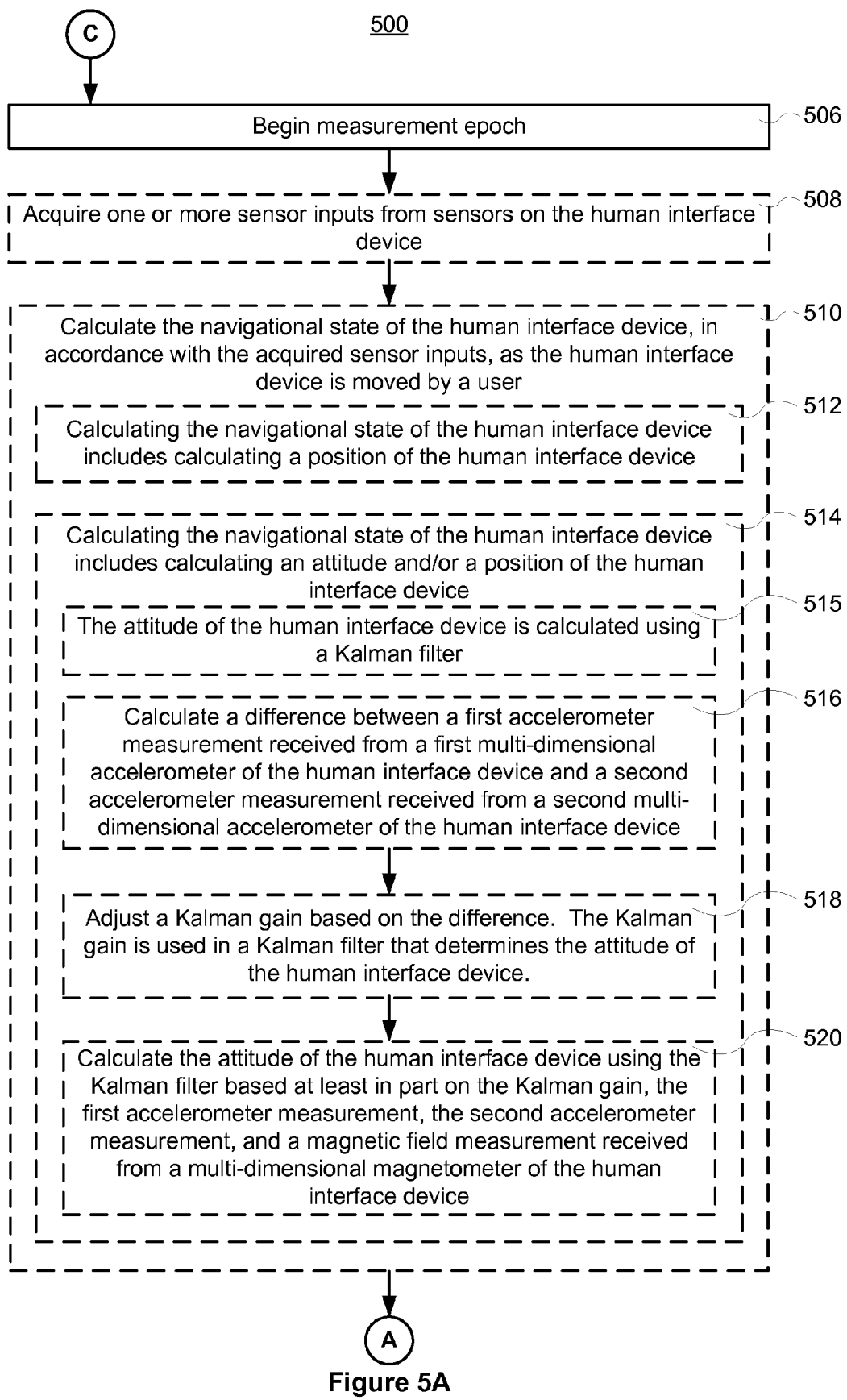
FIGS. 5A-5E are flow diagrams of a method for reducing drift, according to some embodiments.
Figure 5B:
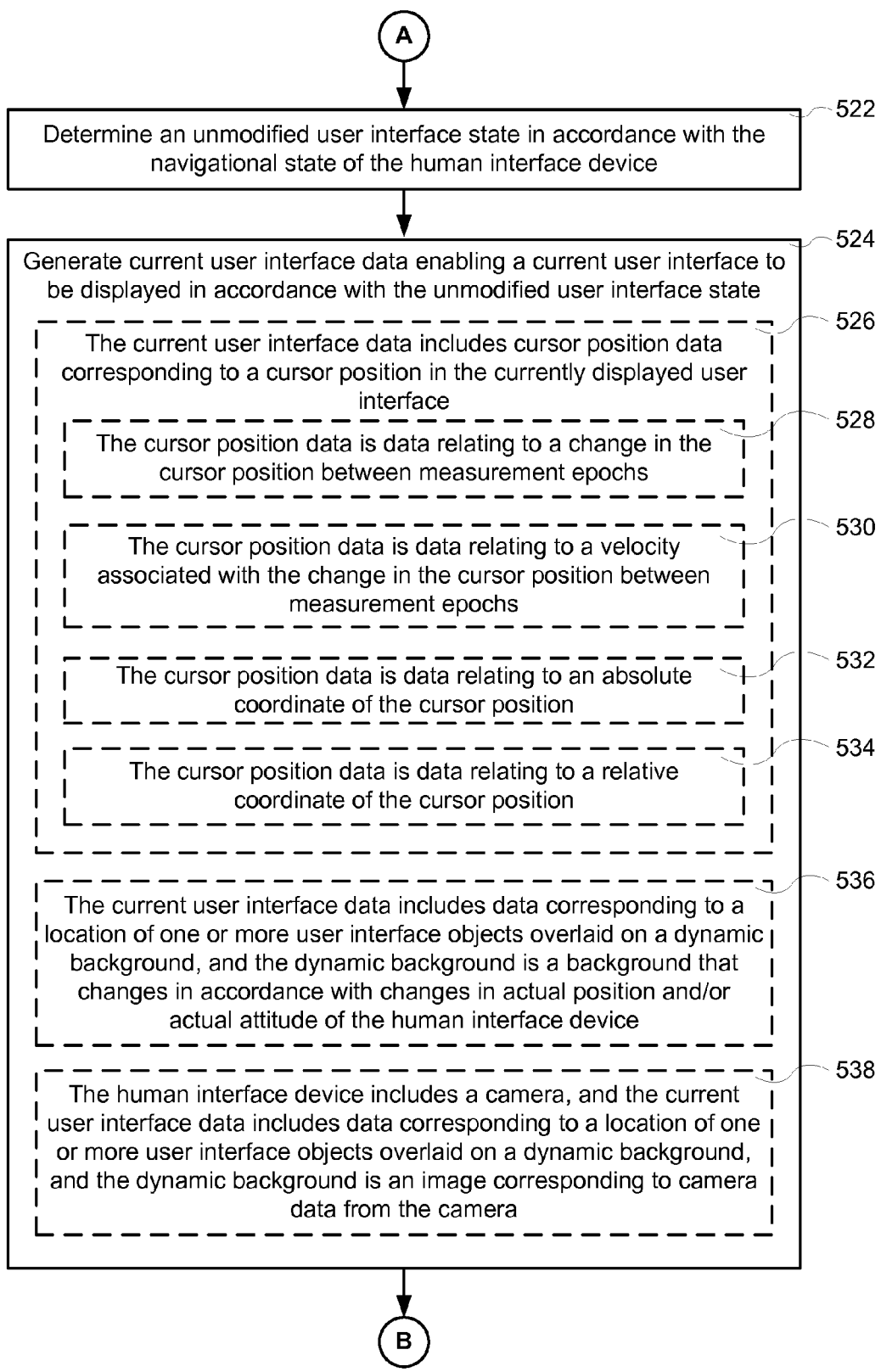
Figure 5C:
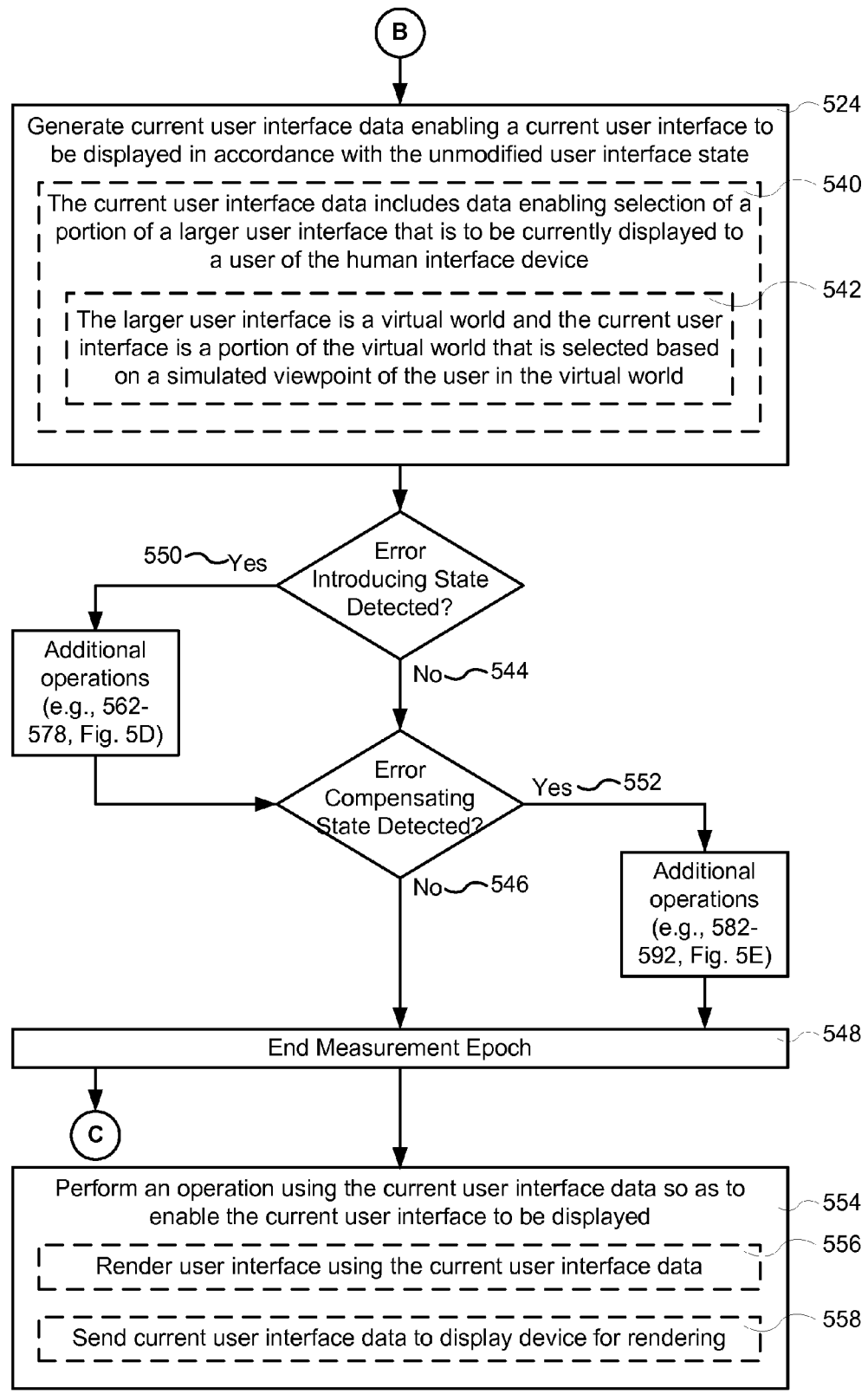
Figure 5D:
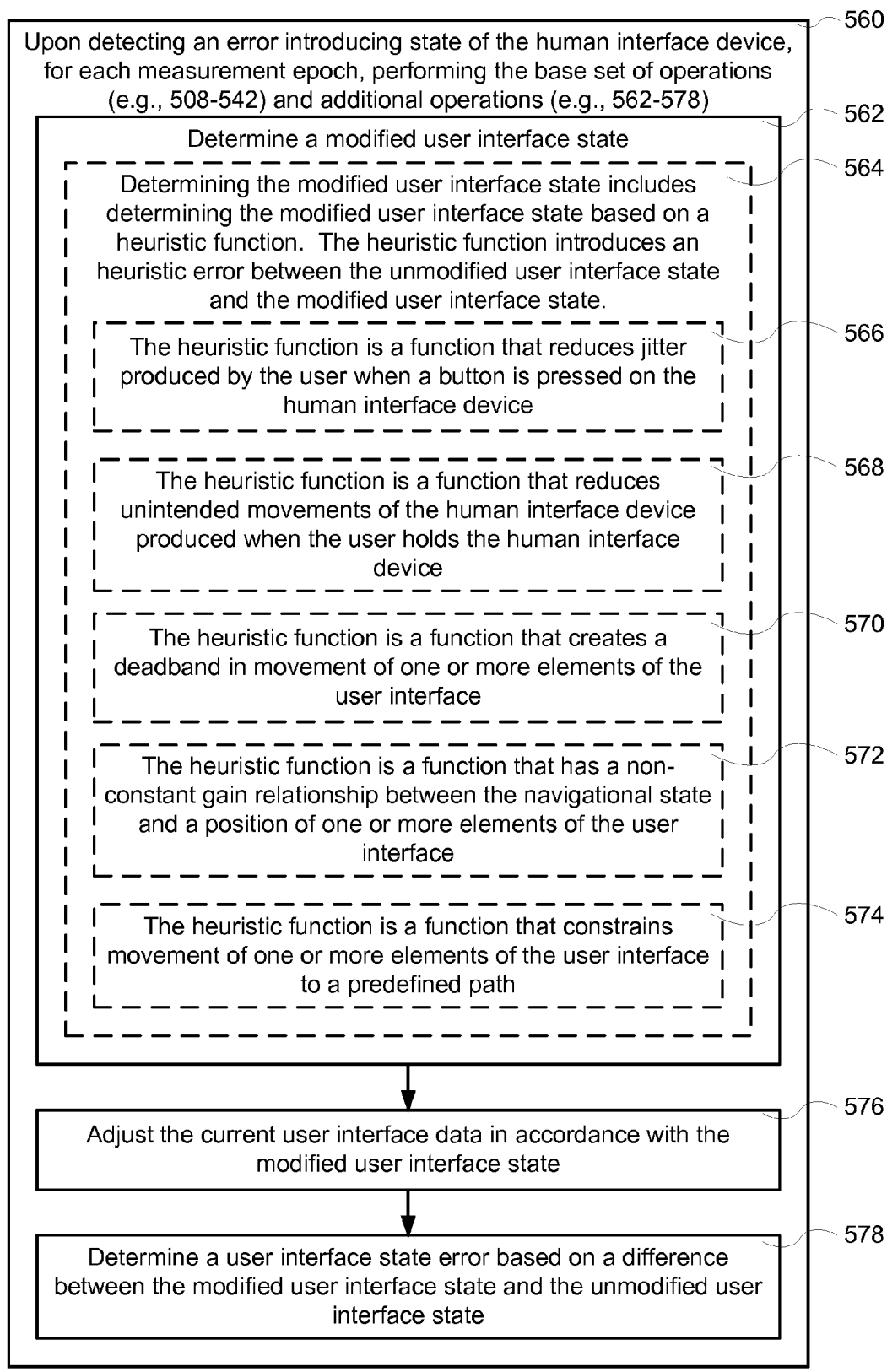
Figure 5E:
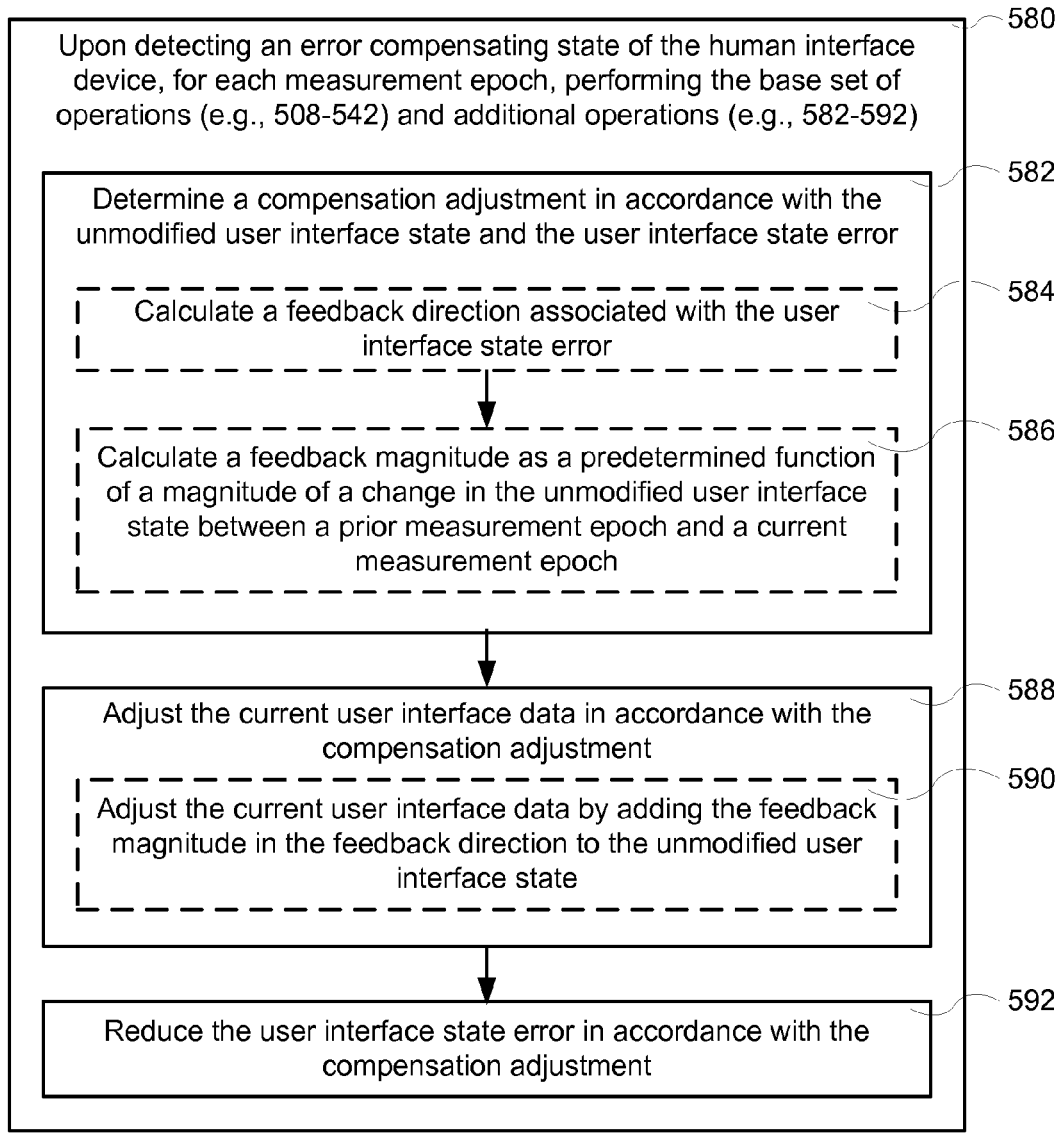

When the error introducing state is not detected (544) and the error compensating state is also not detected (546), the measurement epoch ends (548) without performing any of the operations associated with the error introducing state or the error correcting state, and then proceeds to the next measurement epoch (e.g., returning to operation 506 in FIG. 5A). It should be understood that when one or more operations are described herein as being performed "without performing" particular operations associated with a particular state, the "without performing" means that the particular operations are not performed in the manner and order specified for the particular state. In other words, the "without performing" language is not meant to preclude the possibility that analogous operations could be performed for some reason that is unrelated to the detection of the particular state (e.g., basic computer operations such as reading data are performed as part of virtually all operations of the computer system).

When the error introducing state is detected (550) and the error compensating state is not detected (546), the measurement epoch ends (548) after performing operations (e.g., various ones of operations 562-578 as described in greater detail below) associated with the error introducing state and without performing any of the operations associated with the error correcting state, and then proceeds to the next measurement epoch (e.g., returning to operation 506 in FIG. 5A). In contrast, when the error introducing state is not detected (544) and the error compensating state is detected (552), the measurement epoch ends (548) after performing operations (e.g., various ones of operations 582-592 as described in greater detail below) associated with the error compensating state and without performing any of the operations associated with the error introducing state, and then proceeds to the next measurement epoch (e.g., returning to operation 506 in FIG. 5A).

Finally, when the error introducing state is detected (550) and the error compensating state is also detected (552), the measurement epoch ends (548) after performing operations associated with the error introducing state (e.g., various ones of operations 562-578 as described in greater detail below) and operations associated with the error correcting state (e.g., various ones of operations 582-592 as described in greater detail below), and then proceeds to the next measurement epoch (e.g., returning to operation 506 in FIG. 5A).

For at least some of the measurement epochs (e.g., one or more of the measurement epochs in which the current user interface data is different from the user interface data for the immediately prior measurement epoch, or all of the measurement epochs), the computer system performs an operation (554) using the current user interface data so as to enable the current user interface to be displayed. It should be understood that this operation depends on the arrangement of the display device relative to the user interface module, as illustrated in FIGS. 3A-3E. In embodiments where the display device is part of the computer system that includes the user interface module, the operation includes rendering (556) the current user interface data for display to the user via the display device. In embodiments where the display device is separate from the computer system that includes the user interface module, the operation includes sending (558) the current user interface data to the display device so as to enable the current user interface to be rendered to the user on by the display device (e.g., displayed on a display or projected from a projector onto a display surface). Alternatively, in some embodiments, when there is no change in the current user interface data since the immediately prior measurement epoch, operation 554 is not performed. For example, in some embodiments operation 554 need not be performed because the display device will continue to display the current user interface when there is no change in the current user interface data.

Typically, changes in the navigational state of the user interface device result in corresponding changes to the currently displayed user interface. For example, in response to detecting movement of the human interface device to the right: for a cursor, the computer system moves the cursor to the right; for an augmented reality application, the computer system shifts user interface objects to the left, so that they continue to correspond to the appropriate parts of the real world; and, for a virtual world application, the computer system displays a portion of the virtual world that is to the right of the previously displayed portion of the virtual world. However, in some embodiments an error introducing state is detected when inputs are suppressed by the computer system (e.g., so as to smooth movement, correct for unintentional inputs, stabilize the user interface, etc.). In some embodiments, an error introducing state is detected when the user interface state has been updated in accordance with an estimated navigational state of the human interface device (e.g., from a relative sensor) that turns out to be incorrect as compared to an absolute navigational state (e.g., from an absolute sensor).

Upon detecting an error introducing state of the human interface device, for each measurement epoch, the computer system performs (560) the base set of operations (e.g., various ones of operations 508-542) and additional operations (e.g., various ones of operations 562-578). The computer system determines (562) a modified user interface state (e.g., a state of the user interface that includes a drift in the mapping between the navigational state of the human interface and the currently displayed user interface).

In some embodiments, determining the modified user interface state includes determining (564) the modified user interface state based on a heuristic function, where the heuristic function introduces a heuristic error between the unmodified user interface state and the modified user interface state. In some embodiments, the user interface state error includes the heuristic error (e.g., and other error, such as navigational state estimation error). In some embodiments, the user interface state error is the heuristic error. In other words, in some embodiments, the drift is due partly to an intentional modification of the currently displayed user interface, while in other embodiments the drift is due entirely to intentional modification of the currently displayed user interface. Such intentional modification of the user interface is typically performed using a heuristic function that is designed to improve the operation of the user interface.

In some embodiments, the heuristic function is (566) a function that reduces jitter produced by the user when a button is pressed on the human interface device (e.g., the computer system temporarily ceases to modify the user interface state (e.g., by leaving unchanged the "modified user interface state") in response to changes in the navigational state of the human interface device for a predetermined time period after a button has been pressed, so that the cursor position/augmented reality/virtual world does not shake during button presses). In some embodiments, the heuristic function is (568) a function that reduces changes in the user interface state caused by unintended movements of the human interface device produced when the user holds the human interface device (e.g., the computer system temporarily ceases to modify the user interface state in response to movements with predefined characteristics so as to reduce effects of tremors or other unintentional movements by users). In some embodiments, the heuristic function is (570) a function that creates a deadband in movement of one or more elements of the user interface (e.g., a cursor movement deadband, which keeps the cursor/augmented reality/virtual world stationary unless a user moves the human interface device by more than a predetermined amount or accelerometer measurements in a specified range of quantization levels of the accelerometer measurements are received, as described in greater detail below with reference to equations 28-29).

In some embodiments, the heuristic function is (572) a function that has a non-constant gain relationship between the navigational state and a position of one or more elements of the user interface. For example, in situations where a user is required to make fine adjustments to the user interface the gain relationship between the navigational state and the position may be adjusted so that a relatively large change in the navigational state results in a relatively small change in the position of the user interface element (e.g., when the computer system detects very slow steady changes in navigational state (e.g., a rate of change less than a first predefined threshold) the computer system may display a magnifying glass in the user interface to enable easier manipulation of user interface elements). Similarly, in situations where a user is required to make gross adjustments to the user interface the gain relationship between the navigational state and the position may be adjusted so that a relatively small change in the navigational state results in a relatively large change in the position of the user interface element (e.g., when the computer system detects very fast changes in the navigational state (e.g., a rate of change greater than a second predefined threshold), the computer system may move a cursor more quickly across the user interface).

In some embodiments, the heuristic function is (574) a function that constrains movement of one or more elements of the user interface to a predefined path (e.g., a cursor/augmented reality/virtual world may be constrained to move in a predefined direction, ignoring all changes in the navigational state that do not correspond to movement of the cursor/augmented reality/virtual world in the predefined direction).

The computer system adjusts (576) the current user interface data in accordance with the modified user interface state, as necessary. For example, when the movement of a cursor is constrained to a vertical path, the modified user interface state includes movement of the cursor in the vertical direction in accordance with the change in navigational state. It should be understood that the modified user interface state may not have any visually discernable differences from the unmodified user interface state, rather the difference between the modified user interface state and the unmodified user interface state may include that a current navigational state (instead of the prior navigational state) now corresponds to the currently displayed user interface. For example, when jitter is suppressed by not updating the user interface (e.g., a displayed portion of a virtual world) in response to changes in the navigational state for a predetermined period of time after a button is pressed, the currently displayed user interface may not change (e.g., the same portion of the virtual world continues to be displayed) even while the navigational state of the user interface device changes. Thus, the modified user interface state indicates a different mapping between the navigational state and the currently displayed user interface. It should be understood that, in some embodiments, the current user interface data is not adjusted when user interface state error is generated due to a deadband state heuristic.

The computer system determines (578) a user interface state error based on a difference between the modified user interface state and the unmodified user interface state. The user interface state error is a measure of error in the user interface state, but indirectly (via the mapping between the navigation state and the user interface state) is a measure of the amount of drift of the navigational state of the human interface device relative to the user interface. However, the user interface state error may be quantified in many different ways. For example, when the navigational state of the human interface device is used to determine the position of a cursor on a display, the user interface state error corresponds to a difference between the current position of the cursor and the position that the cursor would have if the drift of the navigational state of the human interface device were eliminated or substantially eliminated. As another example, when the navigational state of the human interface device is used to determine the position of user interface objects in an augmented reality application, the user interface state error corresponds to a difference between the current position a user interface object and its intended position in the augmented reality. As another example, when the navigational state of the human interface device is used to determine the portion of a virtual world that is displayed, the user interface state error corresponds to a difference between the current portion that is displayed and the portion of the virtual world that would be displayed if the drift of the navigational state of the human interface device were eliminated or substantially eliminated.

It should be understood that an error compensating state is only necessary when there is some user interface state error for which compensation is necessary. However, in some circumstances, even when there is a user interface state error, the computer system does not enter an error compensating state. As described previously, it is desirable to avoid changing the user interface while the navigational state of the human interface is not changing (e.g., the human interface device is stationary), so as to avoid making unexpected, undesired changes to the user interface. Thus, even if there is some user interface state error, if the navigational state of the human interface device is not changing, the computer system will not typically detect an error compensating state. Additionally, some of the heuristics described above cause the user interface to temporarily stop responding to changes in the navigational state of the human interface device. Thus, in some embodiments, while an error introducing condition (e.g., button press, non-constant gain, deadband, constrained motion, etc.) is detected, the computer system does not detect an error compensating state. Therefore, in some embodiments, an error compensating state is detected when, for the current epoch, there is a non-zero user interface state error, the change in the navigational state of the human interface device is above a predefined threshold, and an error introducing condition is not currently being detected. Upon detecting the error compensating state of the human interface device, for each measurement epoch, the computer system performs (580) the base set of operations (e.g., various ones of operations 508-542) and additional operations (e.g., various ones of operations 582-592).

The computer system determines (582) a compensation adjustment in accordance with the unmodified user interface state and the user interface state error. In some embodiments, adjusting the current user interface data in accordance with the compensation adjustment includes calculating (586) a feedback direction associated with the user interface state error (a direction that some element of the modified user interface would need to be shifted to reach the position the element would have occupied in the unmodified user interface). Additionally, in some embodiments, adjusting the current user interface also includes calculating (588) a feedback magnitude as a predetermined function of a magnitude of a change in the unmodified user interface state between a prior measurement epoch and a current measurement epoch (e.g., a magnitude that some element of the modified user interface would need to be shifted to reach the position the element would have occupied in the unmodified user interface). It should be understood that this movement roughly corresponds to the amount of movement within the user interface that was intended by the user (e.g., the user intended to move a cursor 200 pixels across a display, or shift an augmented reality view 45 degrees to the right, or shift to a portion of the virtual world that is 30 degrees to the left). Typically the predetermined function is determined so that the adjustment to the current user interface is not noticeable to the user. As one example, the adjustment has a magnitude that is less than approximately 15% of the magnitude of the movement by the user.

In some embodiments, when the error introducing state and the error compensating states are detected concurrently, determining the compensation adjustment also includes adjusting the current user interface data in accordance with other factors (e.g., in accordance with some aspect of the modified user interface state). For example, if movement of elements of the user interface is constrained to movement in the vertical direction and there is a large amount of user interface state error in the horizontal direction, the compensation adjustment can be determined so as to reduce the error in the horizontal direction as much as is possible without moving elements of the user interface in the horizontal direction. In other words, in some embodiments, when changes to the user interface are constrained, the computer system can correct for a larger amount of error without the change being noticed by a user of the navigation system. For example, in an embodiment where the cursor momentarily ceases to be displayed (e.g., when a cursor is moved beyond an edge of the user interface in response to user inputs or is hidden by the computer system during performance of a gesture by the user), the cursor can be redisplayed at a location in the user interface that takes into account all of the user interface state error, because the user will not see the cursor moving in an unanticipated manner.

The computer system adjusts (584) the current user interface data in accordance with the compensation adjustment. In some embodiments, adjusting the current user interface includes adjusting (590) the current user interface data by adding the feedback magnitude in the feedback direction to the unmodified user interface state. For example, if the modified user interface state is that a cursor is displayed 50 pixels too high (e.g., 50 pixels higher on the display than the unmodified user interface state), when the user performs an operation that would move a cursor by 100 pixels to the left, the feedback magnitude would be 15 pixels downwards, and thus the cursor would move 100 pixels to the left and 15 pixels downwards. Additionally, it should be understood that, in some embodiments the feedback magnitude is determined based at least in part on the feedback direction. For example, when the feedback direction includes a component that corresponds to the direction of change in the unmodified user interface state, the feedback magnitude is decreased; and when the feedback direction includes a component that is opposite to the direction of change in the unmodified user interface state, the feedback magnitude is increased. In other words, if a cursor has drifted to the left and the human interface device is moved so as to move the cursor further to the left, a relatively smaller correction will be made to the drift than if the movement of the cursor was unrelated to the direction of the drift (e.g., the feedback magnitude will be 10% of the magnitude of movement of the cursor to the left instead of 15%). In contrast, if a cursor has drifted to the left and the human interface device is moved so as to move the cursor to the right, a relatively larger correction will be made to the drift than if the movement of the cursor was unrelated to the direction of the drift (e.g., the feedback magnitude will be 20% of the magnitude of movement of the cursor to the right instead of 15%).

The computer system reduces (592) the user interface state error in accordance with the compensation adjustment. For example, if the user interface state error was previously 50 pixels in the vertical direction and the compensation adjustment is 15 pixels, then the user interface state error would be reduced to 35 pixels in the vertical direction. In some embodiments, this reduced user interface state error value is used in the next measurement epoch as the user interface state error (e.g., when no additional error introducing conditions are detected in the next measurement epoch). In some embodiments, a new user interface state error is determined for the next measurement epoch (e.g., when additional error introducing conditions are detected in the next measurement epoch).

System Structure

Figure 6:
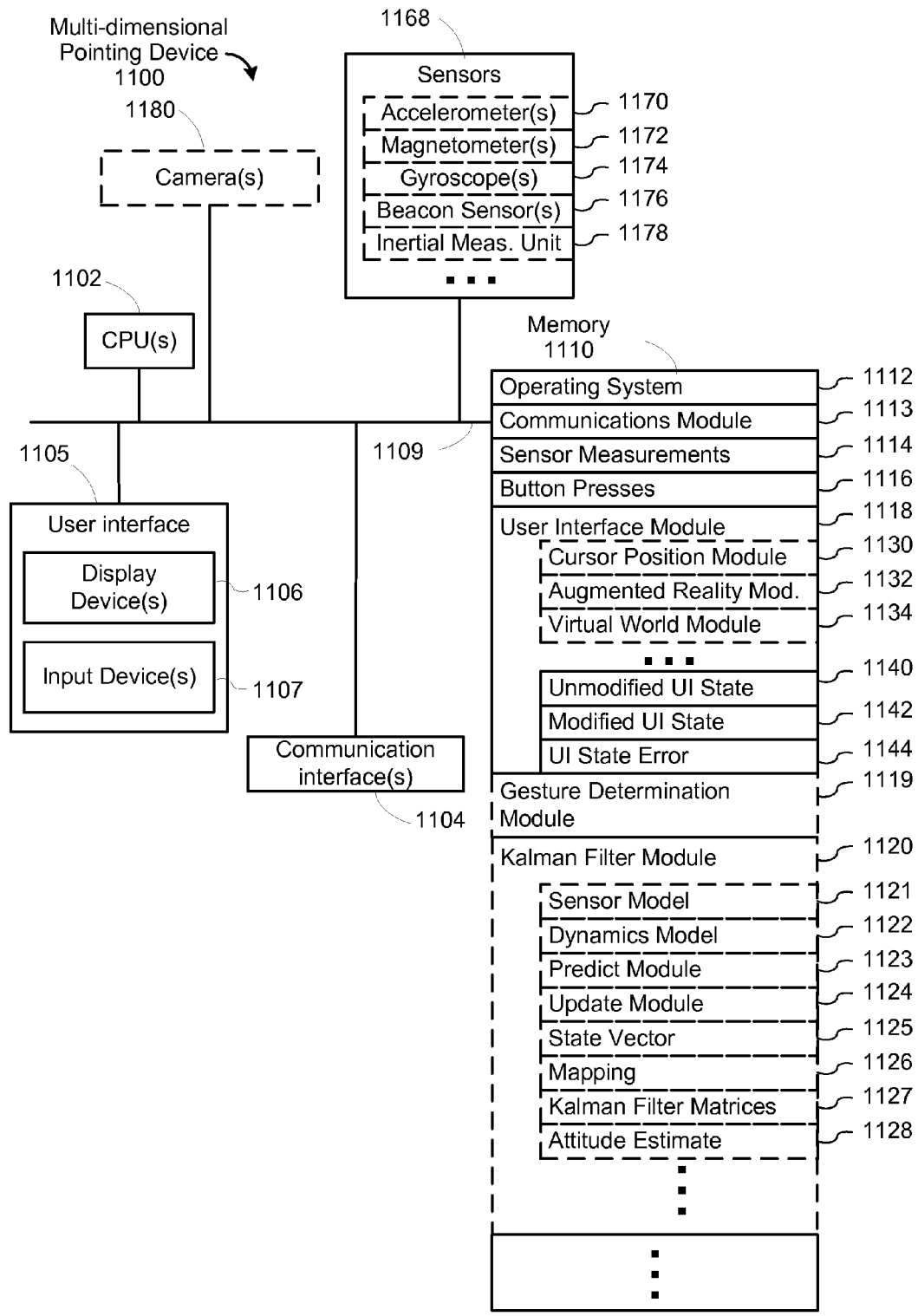
FIG. 6 presents a block diagram of an exemplary human interface device, according to some embodiments.

FIG. 6 is a block diagram of a human interface device 1100. The human interface device 1100 may be any one of the human interface devices 102 (FIGS. 1-5), and 200 (FIGS. 8-16). Human interface device 1100 typically includes one or more processors (CPUs) 1102, one or more network or other communication interfaces 1104 (e.g., a wireless communication interface, as described above with reference to FIG. 1), memory 1110, sensors 1168 (e.g., one or more: accelerometers 1170, magnetometers 1172, gyroscopes 1174, beacon sensors 1176, inertial measurement units 1178, etc.), one or more cameras 1180, and one or more communication buses 1109 for interconnecting these components. In some embodiments, communication interfaces 1104 include a transmitter (e.g., 408 in FIG. 10 below) for transmitting information, such as accelerometer and magnetometer measurements, and/or the computed navigational state of the human interface device 1100, and/or other information to a host system (e.g., host system 101). The communication buses 1109 may include circuitry (sometimes called a chipset) that interconnects and controls communications between system components. Human interface device 1100 optionally includes a user interface 1105 comprising a display device 1106 (LCD display, LED display, CRT display, projector etc.) and input devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 may optionally include one or more storage devices remotely located from the CPU(s) 1102. Memory 1110, or alternately the non-volatile memory device(s) within memory 1110, comprises a non-transitory computer readable storage medium. In some embodiments, memory 1110 stores the following programs, modules and data structures, or a subset thereof:

an operating system 1112 that includes procedures for handling various basic system services and for performing hardware dependent tasks;

a communication module 1113 that is used for connecting the human interface device 1100 to a host system 101 via the one or more communication interfaces 1104 (wired or wireless); the communication module optionally may also be adapted for connecting the human interface device 1100 to one or more communication networks, such as the Internet, other wide area networks, local area networks, metropolitan area networks, and so on;

data representing sensor measurements 1114 (e.g., accelerometer measurements, magnetometer measurements, gyroscope measurements, global positioning system measurements, beacon sensor measurements, inertial measurement unit measurements etc.);

data representing button presses 1116;

a user interface module 1118 that receives commands from the user via the input devices 1107 and generates user interface objects in the display device 1106, the user interface module may include one or more of: a cursor position module 1130 for determining a cursor position for a cursor to be displayed in a user interface in accordance with changes in a navigational state of the human interface device, an augmented reality module 1132 for determining positions of one or more user interface objects to be displayed overlaying a dynamic background such as a camera output in accordance with changes in a navigational state of the human interface device, a virtual world module 1134 for determining a portion of a larger user interface (a portion of a virtual world) to be displayed in accordance with changes in a navigational state of the human interface device, and other application specific user interface modules; additionally, in some embodiments, the user interface module stores an unmodified user interface state 1140 that corresponds to a state of the user interface that directly corresponds to the navigational state of the human interface device (i.e., with no drift, or no drift to a predefined level of accuracy, between the navigational state of the human interface device and the user interface), a modified user interface state 1142 that corresponds to a state of the user interface that takes into account drift, if any, between the navigational state of the human interface device and the user interface, and a user interface state error 1144 that corresponds to the amount of drift between the unmodified user interface state and the modified user interface state;

a gesture determination module 1119 optionally determines gestures based on a sequence of corrected attitude measurements, as described below with reference to FIGS. 8-16; and a Kalman filter module 1120 that determines the attitude of human interface device 1100, as described below with respect to FIGS. 14-16 and Equations (8)-(29), wherein the Kalman filter module 1120 includes: a sensor model 1121 (e.g., the sensor model described in Equations (28)-(29)), a dynamics model 1122 (e.g., the dynamics model described in Equations (15)-(21)), a predict module 1123 that performs the predict phase operations of the Kalman filter (e.g., step 802 in FIG. 14), an update module 1124 that performs the update operations of the Kalman filter (e.g., step 806 in FIG. 14), a state vector 1125 of the Kalman filter (e.g., the state vector $\hat{x}$ in Equation (10)), a mapping 1126 (e.g., the mapping 808 in FIG. 14), Kalman filter matrices 1127 (e.g., the Kalman filter matrices P, G, S, K, R, etc., as described above), and attitude estimates 1128 (e.g., the attitude estimates as obtained from the quaternion in the state vector $\hat{x}$ in Equation (10)).

It is noted that in some of the embodiments described above, human interface device 1100 does not include a gesture determination module 1119, because gesture determination is performed by a host system 101. In some embodiments described above, human interface device 1100 also does not include Kalman filter module 1120 because human interface device 1100 transmits sensor measurements (e.g., accelerometer and magnetometer measurements) and, optionally, button presses 1116 to a host system 101 at which the attitude of human interface device 1100 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, memory 1110 may store a subset of the modules and data structures identified above. Furthermore, memory 1110 may store additional modules and data structures not described above.

Although FIG. 6 shows a "human interface device," FIG. 6 is intended more as functional description of the various features which may be present in a human interface device. In practice, and as recognized by those of ordinary skill in the art, items shown separately could be combined and some items could be separated.

Figure 7:
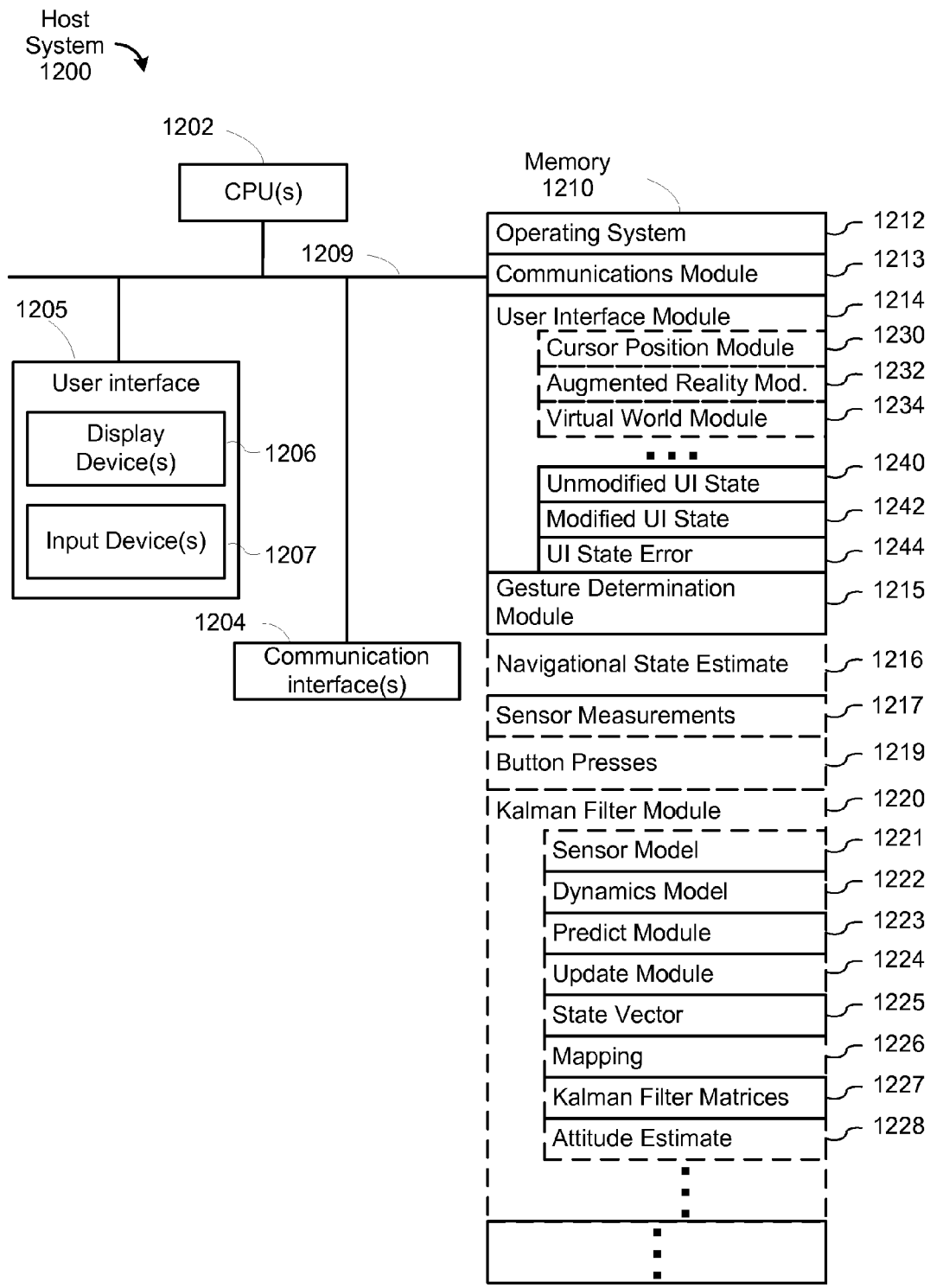
FIG. 7 presents a block diagram of an exemplary host system, according to some embodiments.
Figure 9:
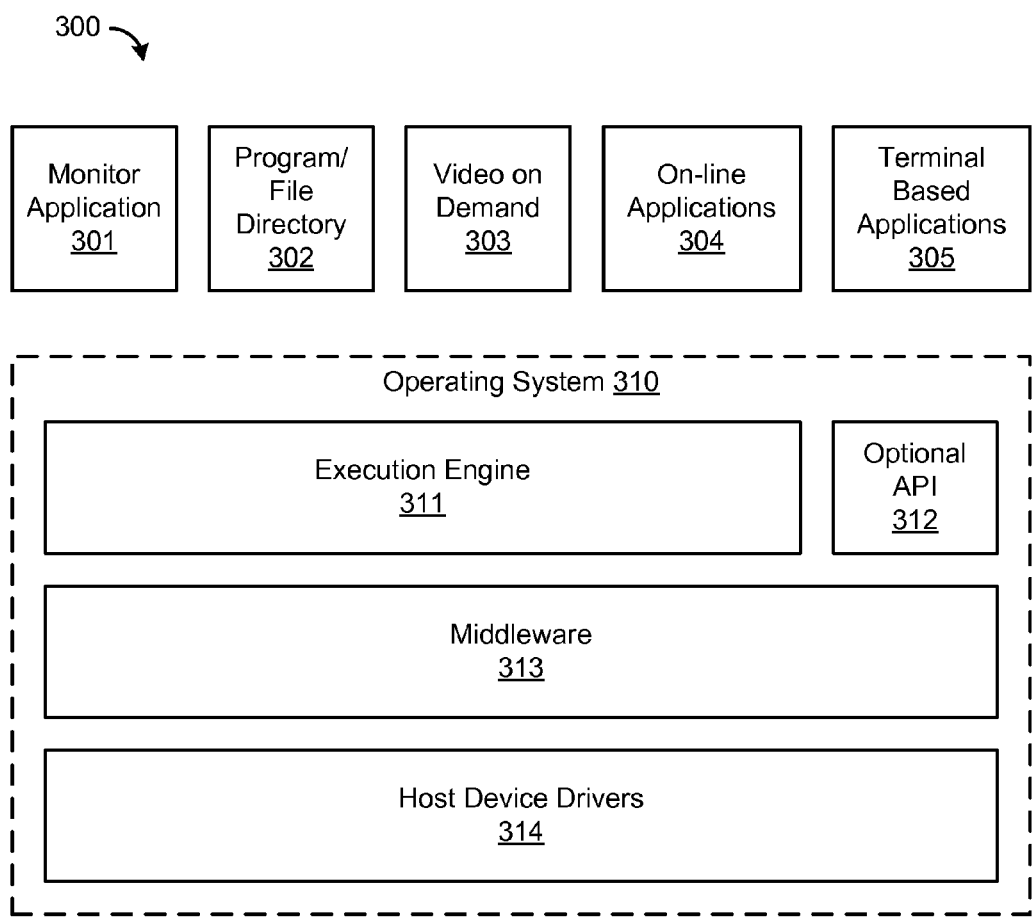
FIG. 9 is a block diagram illustrating inputs, outputs, and operations of an exemplary software architecture for a host system, according to some embodiments.

FIG. 7 is a block diagram of a host system 1200. Host system 1200 may be any one of the host systems 101, or software architecture 300 described herein. Host system 1200 typically includes one or more processors (CPU's) 1202, one or more network or other communication interfaces 1204 (e.g., any of the wireless interfaces described above with reference to FIG. 1), memory 1210, and one or more communication buses 1209 for interconnecting these components. In some embodiments, communication interfaces 1204 include a receiver for receiving information, such as accelerometer and magnetometer measurements, and/or the computed attitude of a human interface device (e.g., human interface device 102, 200 or 1100), and/or other information from the human interface device. Communication buses 1209 may include circuitry (sometimes called a chipset) that interconnects and controls communications between system components. Host system 1200 optionally may include a user interface 1205 comprising a display device 1206 (LCD display, LED display, CRT display, projector, etc.) and input devices 1207 (e.g., human interface device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 may optionally include one or more storage devices remotely located from the CPU(s) 1202. Memory 1210, or alternately the non-volatile memory device(s) within memory 1210, comprises a non-transitory computer readable storage medium. In some embodiments, memory 1210 stores the following programs, modules and data structures, or a subset thereof:

an operating system 1212 that includes procedures for handling various basic system services and for performing hardware dependent tasks (e.g., the middleware 313 in FIG. 9);

a communication module 1213 that is used for connecting host system 1200 to a human interface device (e.g., human interface device 1100), and/or other devices or systems via the one or more communication interfaces 1204 (wired or wireless), and for connecting host system 1200 to one or more communication networks, such as the Internet, other wide area networks, local area networks, metropolitan area networks, and so on;

a user interface module 1214 that receives commands from the user via the input devices 1207 and generates user interface objects in the display device 1206; the user interface module may include one or more of: a cursor position module 1230 for determining a cursor position for a cursor to be displayed in a user interface in accordance with changes in a navigational state of the human interface device, an augmented reality module 1232 for determining positions of one or more user interface objects to be displayed overlaying a dynamic background such as a camera output in accordance with changes in a navigational state of the human interface device, a virtual world module 1234 for determining a portion of a larger user interface (a portion of a virtual world) to be displayed in accordance with changes in a navigational state of the human interface device, and other application specific user interface modules; additionally, in some embodiments, the user interface module stores an unmodified user interface state 1240 that corresponds to a state of the user interface that directly corresponds to the navigational state of the human interface device (i.e., with no drift, or no drift to a predefined level of accuracy, between the navigational state of the human interface device and the user interface), a modified user interface state 1242 that corresponds to a state of the user interface that takes into account drift, if any, between the navigational state of the human interface device and the user interface, and a user interface state error 1244 that corresponds to the amount of drift between the unmodified user interface state and the modified user interface state;

a gesture determination module 1215 that determines gestures based on a sequence of corrected navigational states measurements for a human interface device, as described below;

data representing a navigational state estimate 1216 that is received from a human interface device;

data representing sensor measurements 1217 (e.g., accelerometer measurements, magnetometer measurements, gyroscope measurements, global positioning system measurements, beacon sensor measurements, inertial measurement unit measurements etc.) received from a human interface device and/or determined at the host system;

data representing button presses 1219 received from a multi-dimensional positioning device; and a Kalman filter module 1220 that determines the attitude of a respective human interface device, as described below with respect to FIGS. 14-16 and Equations (8)-(29), wherein the Kalman filter module 1220 includes: a sensor model 1221 (e.g., the sensor model described in Equations (28)-(29)), a dynamics model 1222 (e.g., the dynamics model described in Equations (15)-(21)), a predict module 1223 that performs the predict phase operations of the Kalman filter (e.g., step 802 in FIG. 14), an update module 1224 that performs the update operations of the Kalman filter (e.g., step 806 in FIG. 14), a state vector 1225 of the Kalman filter (e.g., the state vector $\hat{x}$ in Equation (10)), a mapping 1226 (e.g., the mapping 808 in FIG. 14), Kalman filter matrices 1227 (e.g., the Kalman filter matrices P, G, S, K, R, etc., as described below), and attitude estimates 1228 (e.g., the attitude estimates as obtained from the quaternion in the state vector $\hat{x}$ in Equation (10)).

It is noted that in some of the embodiments described above, host system 1200 does not store data representing sensor measurements 1217, and also does not include Kalman filter module 1220 because the human interface device's sensor measurements are processed at the human interface device, which sends data representing the navigational state estimate 1216 to host system 1200. In other embodiments, the human interface device sends data representing the sensor measurements 1217 to host system 1200, in which case the modules for processing that data are present in host system 1200.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement host system 1200 and how features are allocated among them will vary from one implementation to another. In some embodiments, memory 1210 may store a subset of the modules and data structures identified above. Furthermore, memory 1210 may store additional modules and data structures not described above.

Note that diagram 500 described above and methods 800 and 1000 described below may be governed by instructions that are stored in a non-transitory computer readable storage medium and that are executed by one or more processors of a human interface device or a host system. As noted above, in some embodiments these methods may be performed in part on a human interface device and in part on a host system, or on a single integrated system which performs all the necessary operations. Each of the operations shown in FIGS. 5A-5E, 14 and 16 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

While the descriptions provided above address various methods and systems for compensating for drift between a navigational state of a human interface device and a currently displayed user interface, the descriptions provided below address how to determine the navigational state of a human interface device based on sensor measurements. Accurately determining a navigational state of a human interface device is a non-trivial problem. While a number of different approaches to determining a navigational state of a human interface device are known in the art, many of these approaches are either prohibitively expensive, insufficiently accurate or suffer from other flaws that make them unsuitable for use with the human interface (e.g., 102, 1100, 200) device described herein. As such, in order to provide a more complete description of the disclosed embodiments, an exemplary human interface device 200 including one or more multi-dimensional magnetometers and two or more multi-dimensional accelerometers that are used to inexpensively and accurately determine the attitude of human interface device 200 is described below. It should be understood that human interface device 200 is a particular embodiment of the human interface devices 102, 1100 described above.

Attitude Determination

One problem with accurately determining a navigational state (e.g., position and/or attitude) of a human interface device is that the movement of human interface device 200 causes accelerations and decelerations that may cause conventional attitude-determination techniques to fail. Specifically, consider a device that includes a single multi-dimensional magnetometer (e.g., a tri-axial magnetometer) and a single multi-dimensional accelerometer (e.g., a tri-axial accelerometer), which is subject to dynamic acceleration. Note that the term "dynamic acceleration" refers to acceleration and/or deceleration (e.g., accelerations/decelerations during movement of the device). Applying the TRIAD technique to magnetic field measurements from a single multi-dimensional magnetometer and acceleration measurements from a single multi-dimensional accelerometer results in attitude measurements that include errors. The errors arise because the TRIAD technique depends on a constant relationship between the Earth's magnetic field and gravity. Consequently, the TRIAD technique only produces correct attitude measurements when the device is not undergoing dynamic acceleration (e.g., at rest or at constant velocity). If the device is being accelerated, the acceleration measurement includes a combination of gravity and the acceleration imparted by movements of the device. Using this acceleration measurement to represent the Earth's gravity produces substantial errors in the computed attitude. These problems are described in more detail with respect to FIGS. 11-13 below.

One solution is to use a human interface device that includes a gyroscope (e.g., a MEMS gyroscope). However, the physics of the gyroscopes can cause artifacts. For example, these types of human interface devices can drift when the device is held in a stationary position. Furthermore, these human interface devices can require substantial force before the device produces a reaction in the user interface.

Thus, to solve the aforementioned problems, some embodiments use magnetic field measurements from one or more multi-dimensional magnetometers and acceleration measurements from two or more multi-dimensional accelerometers that are included in a human interface device to calculate the attitude of the device. In these embodiments, the calculated attitude of the human interface device is compensated for errors that would otherwise be caused by dynamic acceleration. In some embodiments, the multi-dimensional accelerometers are placed a specified distance apart in a rigid frame (e.g., a printed circuit board on the device). When the human interface device is rotated, the multi-dimensional accelerometers experience different accelerations due to their different radiuses of rotation. Note that when the frame is moved in translation (e.g., without rotation), all the accelerometers experience the same acceleration. It is then possible to use the differences in the accelerometer readings to distinguish between user movement (e.g., dynamic acceleration) and the acceleration caused by Earth's gravity to correctly estimate the attitude of the device.

Figure 8:
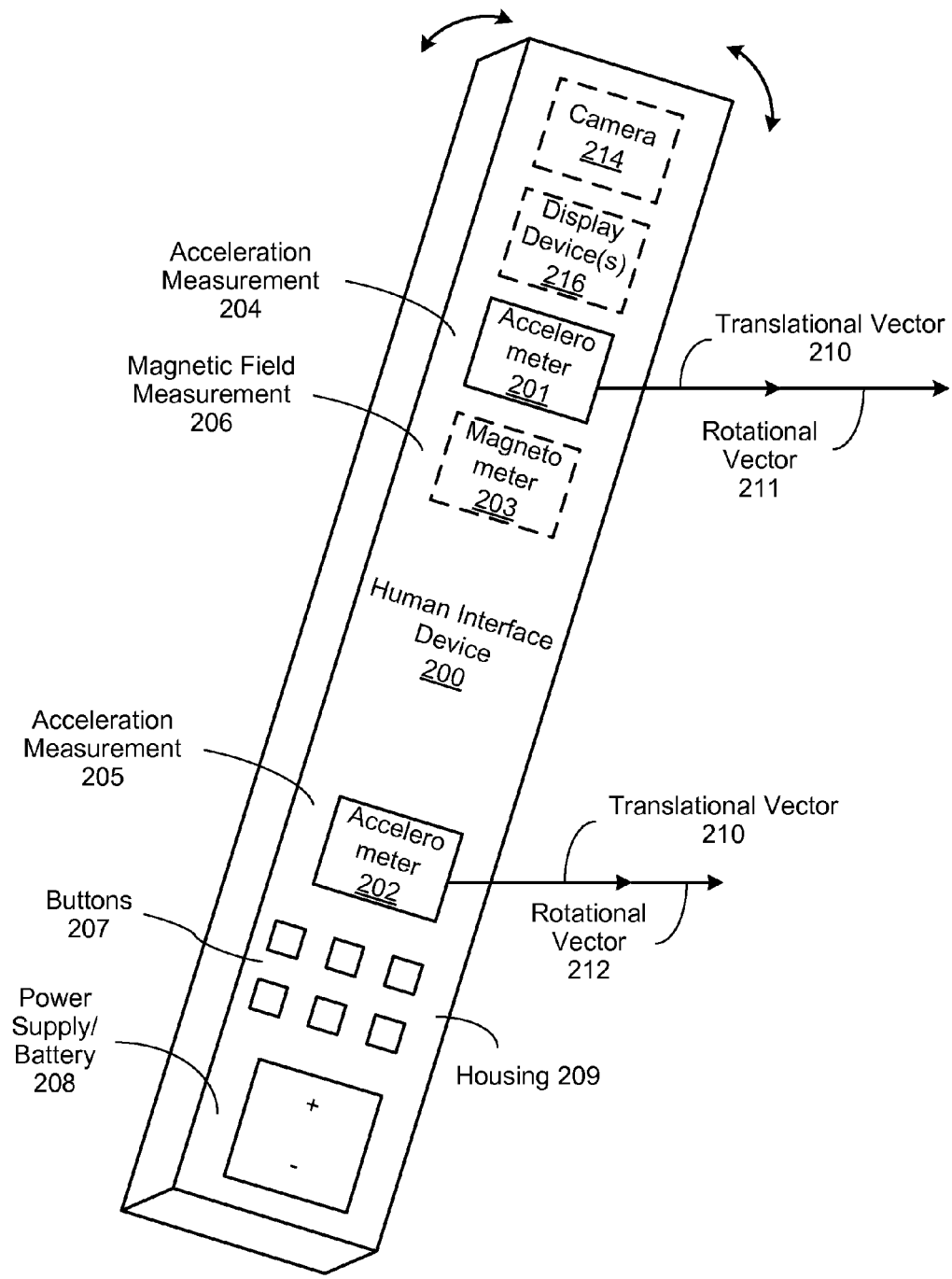
FIG. 8 is a block diagram illustrating an exemplary human interface device including at least one magnetometer and at least two accelerometers, according to some embodiments.

FIG. 8 is a block diagram illustrating an exemplary human interface device 200, according to some embodiments. In accordance with some embodiments, human interface device 200 includes two or more multi-dimensional accelerometers 201-202 that produce composite acceleration measurements 204-205 (e.g., a composite/vector sum of translational acceleration vectors 210, rotational acceleration vectors 211-212, and acceleration due to Earth's gravity), one or more multi-dimensional magnetometers 203 that produce magnetic field measurements 206 (e.g., the Earth's magnetic field), buttons 207, a power supply and/or battery 208, a camera 214 and one or more display devices (e.g., displays and/or projectors). In some embodiments, the two or more multi-dimensional accelerometers 201-202 that produce acceleration measurements 204-205, one or more multi-dimensional magnetometers 203 that produce the magnetic field measurements 206, buttons 207, and the power supply or battery 208 are all enclosed in a housing 209 of human interface device 200.

In some embodiments, the two or more multi-dimensional accelerometers 201-202 are selected from the group consisting of: a 2-axis accelerometer that measures a magnitude and a direction of an acceleration force in two dimensions and a 3-axis accelerometer that measures a magnitude and a direction of an acceleration force in three dimensions.

In some embodiments, the one or more multi-dimensional magnetometers 203 are selected from the group consisting of: a 2-axis magnetometer that measures a magnitude and a direction of a magnetic field in two dimensions and a 3-axis magnetometer that measures a magnitude and a direction of a magnetic field in three dimensions.

In some embodiments, human interface device 200 also includes one or more of the following additional user interface components: a keypad, one or more thumb wheels, one or more light-emitting diodes (LEDs), an audio speaker, an audio microphone, a liquid crystal display (LCD), a projector, etc.

In some embodiments, human interface device 200 includes one or more processors (e.g., 1102, FIG. 6). In these embodiments, the one or more processors process the acceleration measurements received from multi-dimensional accelerometers 201-202 and/or magnetic field measurements received from multi-dimensional magnetometer 203 to determine displacements (e.g., lateral displacements and/or attitude changes) of human interface device 200. These calculations are described in more detail with respect to FIGS. 14-16 below.

In some embodiments, the one or more processors of human interface device 200 perform one or more of the following operations: sampling measurement values, at a respective sampling rate, produced by each of the multi-dimensional accelerometers 201-202 and the multi-dimensional magnetometers 203; processing sampled data to determine displacement; transmitting displacement information to host system 101; monitoring the battery voltage and alerting host system 101 when the charge of the battery is low; monitoring other user input devices (e.g., keypads, buttons, etc.), if any, on human interface device 200 (sometimes called a multi-dimensional pointing device); continuously or periodically run background processes to maintain or update calibration of the multi-dimensional accelerometers 201-202 and the multi-dimensional magnetometers 203; provide feedback to the user as needed on the remote (e.g., via LEDs, etc.); and recognizing gestures performed by user movement of the multi-dimensional pointing device (human interface device 200).

Software Architecture

FIG. 9 is a block diagram illustrating an exemplary software architecture 300 for the host system (e.g., 101 or 1200).

The software architecture 300 includes a monitor application 301 to receive either accelerometer and magnetometer measurements or attitude measurements from human interface device 200, depending on whether human interface device 200 or the host system processes the measurements so as to produce attitude measurements. The software architecture also includes a program/file directory 302 (e.g., an electronic program guide, etc.) that includes information about programs and/or media files (e.g., titles, times, channels, etc.), a video-on-demand application 303 that provides access to one or more video-on-demand services, online applications 304 that provide access to applications provided by a service provider (e.g., cable/satellite television providers, Internet service providers, Internet websites, game providers, online multimedia providers, etc.), and terminal based applications 305 that are (or that provide access to) applications that are resident on host system 101 (e.g., games that are played on the host system, Internet browsing applications, multimedia viewing and/or sharing applications, email applications, etc.). In some embodiments, the human interface device 200 includes a subset of these applications. Furthermore, the human interface device 200 may include additional applications, modules and data structures not described above.

The software architecture 300 also includes an operating system (e.g., OpenCable Application Platform (OCAP), Windows, Linux, etc.) 310, which includes an execution engine (or virtual machine) 311 that executes applications, an optional API 312 for communicating with a human interface device that does not conform to a human interface standard implemented in the operating system 310, middleware 313 that provides management of the resources of host system 101 (e.g., allocation of memory, access to access hardware, etc.) and services that connect software components and/or applications, respectively, and host device drivers 314. In some embodiments, host device drivers 314 adjust the gain of human interface device 200 based on the resolution and/or aspect ratio of the display of host system 101, translates physical movement of human interface device 200 to movement of a cursor (or an object) within the user interface of host system 101, allows host applications to adjust cursor movement sensitivity, and/or reports hardware errors (e.g., a battery low condition, etc.) to middleware 313.

In some embodiments, human interface device 200 periodically samples its sensors. Human interface device 200 may also periodically provide the sampled sensor data to the host system (e.g., 101 or 1200) at a respective update rate. To reduce power consumption caused by transmitting data to host system 101, the update rate may be set at a substantially smaller rate than the sampling rate. Note that the minimum update rate may be governed by the frame rate of the display of the host system (e.g., 25 Hz in Europe and 30 Hz in the United States and Asia). Note that there may be no perceivable advantage in providing faster updates than the frame rate except when the transmission media is lossy.

In some embodiments, human interface device 200 uses digital signal processing techniques. Thus, the sampling rate must be set high enough to avoid aliasing errors. Movements typically occur at or below 10 Hz, but AC power can create ambient magnetic field fluctuations at 50-60 Hz that can be picked up by a magnetometer. For example, to make sure there is sufficient attenuation above 10 Hz, human interface device 200 may use a 100 Hz sampling rate and a 50 Hz update rate.

In some embodiments, human interface device 200 reports raw acceleration and magnetic field measurements to host system 101. In these embodiments, the host device drivers 314 calculate lateral and/or angular displacements based on the measurements. The lateral and/or angular displacements are then translated to cursor movements based on the size and/or the resolution of the display of host system 101. In some embodiments, host device drivers 314 use a discrete representation of angular displacement to perform sampling rate conversion to smoothly convert from the physical resolution of human interface device 200 (e.g., the resolution of the accelerometers and/or the magnetometers) to the resolution of the display.

In some embodiments, host device drivers 314 interpret a sequence of movements (e.g., changes in attitude, displacements, etc.) as a gesture. For example, the user 103 may use human interface device 200 to move a cursor in a user interface of host system 101 so that the cursor points to a dial on the display of host system 101. The user 103 can then select the dial (e.g., by pressing a button on human interface device 200) and turn human interface device 200 clockwise or counter-clockwise (e.g., roll) to activate a virtual knob that changes the brightness, contrast, volume, etc., of a television set. Thus, the user 103 may use a combination or sequence of keypad presses and pointing device movements to convey commands to the host system. Similarly, the user 103 may use a twist of a wrist to select the corner of a selected image (or video) for sizing purposes. Note that the corner of an image may be close to another active object. Thus, selecting the image may require careful manipulation of human interface device 200 and could be a tiresome exercise. In these cases, using a roll movement as a context sensitive select button may reduce the accuracy users need to maintain with the movement of human interface device 200.

In some embodiments, human interface device 200 computes the physical displacement of the device and transmits the physical displacement of the device to host system 101. Host device drivers 314 interpret the displacement as cursor movements and/or gestures. Thus, host device drivers 314 can be periodically updated with new gestures and/or commands to improve user experience without having to update the firmware in human interface device 200.

In some other embodiments, human interface device 200 computes the physical displacement of the device and interprets the displacements as cursor movements and/or gestures. The determined cursor movements and/or gestures are then transmitted to host system 101.

In some embodiments, human interface device 200 reports its physical spatial (e.g., lateral and/or angular) displacements based on a fixed spatial resolution to host system 101. Host device drivers 314 interpret the distance and/or angle traversed into appropriate cursor movements based on the size of the display and/or the resolution of the display. These calculated displacements are then translated into cursor movements in the user interface of host system 101.

Although human interface device 200 may provide data (e.g., position/displacement information, raw measurements, etc.) to host system 101 at a rate greater than the frame rate of a display of host system 101, the host device drivers 314 needs to be robust enough to accommodate situations where packet transmission fails. In some embodiments, each packet received from human interface device 200 is time stamped so that host device drivers 314 can extrapolate or interpolate missing data. This time stamp information may also be used for gesture recognition to compensate for a lossy transmission media.

In some embodiments, human interface device 200 omits packets to conserve power and/or bandwidth. In some embodiments, human interface device 200 omits packets to conserve power and/or bandwidth only if it is determined that host device drivers 314 can recreate the lost packets with minimal error. For example, human interface device 200 may determine that packets may be omitted if the same extrapolation algorithm is running on host system 101 and on human interface device 200. In these cases, human interface device 200 may compare the real coordinates against the extrapolated coordinates and omit the transmission of specified packets of data if the extrapolated coordinates and the real coordinates are substantially similar.

In some embodiments, human interface device 200 includes a plurality of buttons. The plurality of buttons allows users that prefer a conventional user interface (e.g., arrow keys, etc.) to continue using the conventional user interface. In these embodiments, host device drivers 314 may need to interpret a combination of these buttons as a single event to be conveyed to middleware 313 of the host system.

In some embodiments, host device drivers 314 are configured so that human interface device 200 is treated by host system 101 as a two-dimensional pointing device (e.g., mouse, trackpad, trackball, etc.).

Figure 10:
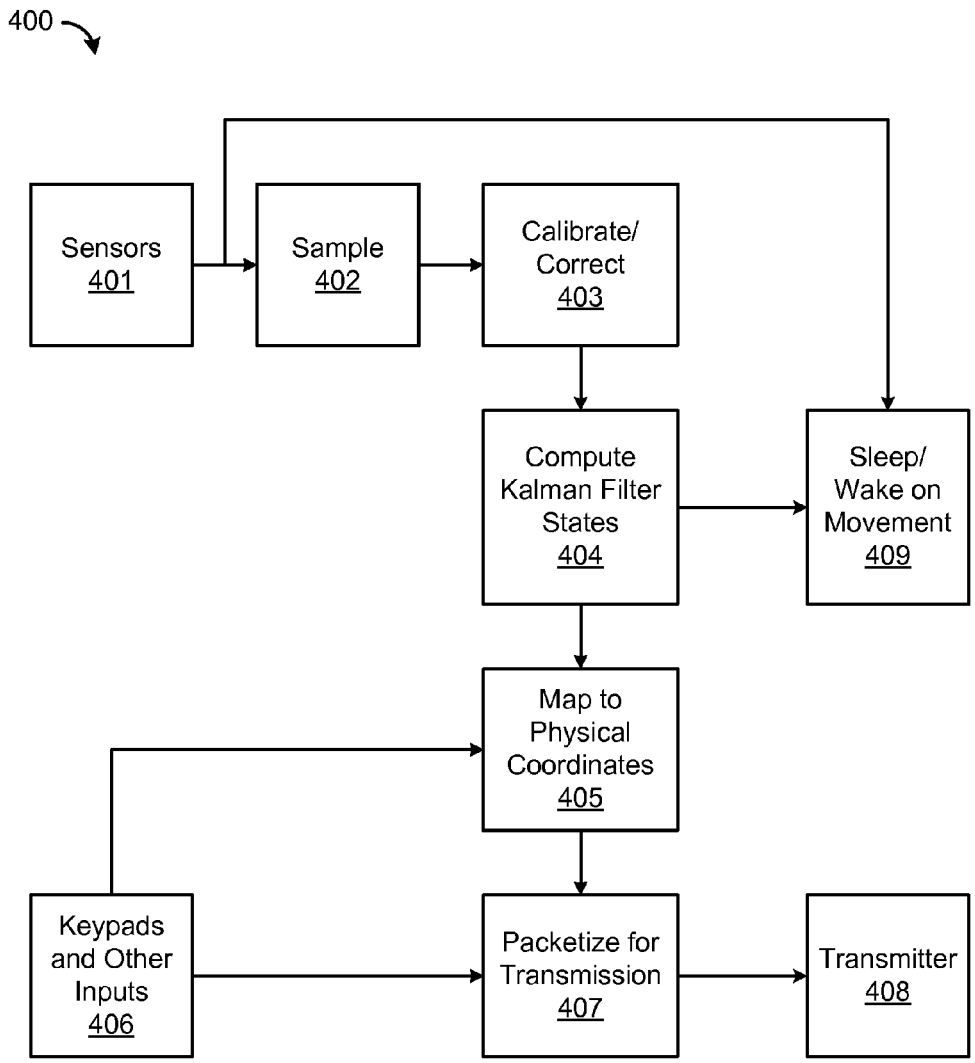
FIG. 10 is a block diagram illustrating an exemplary device-side firmware for a human interface device, according to some embodiments.

FIG. 10 is a block diagram illustrating inputs, outputs, and operations of an exemplary device-side firmware 400 for human interface device 200, according to some embodiments. Sensors 401 generate measurements that may be sampled by one or more sampling circuits 402.

In some embodiments, the sampled sensor measurements are packetized for transmission 407 and transmitted to host system 101 by a transmitter 408.

In some embodiments, sensors 401 are calibrated and corrected 403. For example, the sensors 401 may be calibrated and corrected so that a Kalman filter that is used to compute the attitude of a human interface device (e.g., the human interface device 200 in FIG. 8, etc.) is initialized with a zero assumed error. The Kalman filter states are then determined 404. The determined Kalman filter states are then mapped to physical coordinates 405, and data representing the physical coordinates are packetized for transmission 407 by the transmitter 408. Keypad and other inputs 406 may also be packetized for transmission 407 and transmitted by the transmitter 408. In some embodiments, the keypad and/or other inputs 406 are used in conjunction movements of the human interface device 200 to produce gestures that convey commands to a host system. In some of these embodiments, the keypad and other inputs 406 are mapped to physical coordinates 405 (e.g., noting the physical coordinates at which the keypad and other inputs were activated) prior to being packetized for transmission 407. Alternately, the time ordered sequence in which keypad presses (or other inputs) and changes in position of the human interface device 200 are packetized and transmitted to the host system is used by the device to determine the context of the keypad presses (or other inputs) and to determine what gesture(s) were performed by the user.

The measurements from the sensors and the determined change in position and/or attitude may also be used to enter and/or exit sleep and wake-on-movement modes 409.

In some embodiments, human interface device 200 measures rotations of the human interface device over a physical space that is independent of the size, distance and direction of the display of host system 101. In fact, human interface device 200 may report only displacements between two consecutive samples in time. Thus, the orientation of human interface device 200 does not matter. For example, yaw may be mapped to left/right cursor movement and pitch may be mapped to up/down cursor movements.

In some embodiments, to conserve system power, human interface device 200 detects a lack of movement of human interface device 200 for more than a predetermined time period and puts itself into a low power (e.g., sleep) mode. In some embodiments, a single accelerometer is used to sense whether human interface device 200 is being moved and to generate an interrupt to wake (e.g., wake-on-demand) human interface device 200 from the sleep mode.

In some embodiments, human interface device 200 determines that it should enter a sleep mode based on one or more of the following conditions: the magnitude of the acceleration measurement (e.g., $A_{observed}$) is not greater or smaller than the magnitude of Earth's gravity (e.g., G) by a specified threshold, the standard deviation of $A_{observed}$ does not exceed a specified threshold, and/or there is an absence of change in the angular relationship between the measurement of the Earth's magnetic field (e.g., B) and $A_{observed}$ greater than a specified threshold. Each of the aforementioned conditions may be used to indicate that the human interface device 200 has entered a resting state (e.g., no substantial movement). After human interface device 200 has remained in a resting state for a specified number of consecutive samples, human interface device 200 enters a sleep mode.

In some embodiments, device-side firmware 400 of human interface device 200 is updated by host system 101 via a wireless interface.

Some embodiments provide one or more games and/or demo applications that demonstrate how to use the human interface device (e.g., movement, controlling objects in the user interface, gestures, etc.).

Calculating Attitude During Dynamic Acceleration

FIG. 11 is a diagram 500 illustrating exemplary gravity (G) and magnetic field (B) vectors that can be used to determine attitude, according to some embodiments. In some embodiments, G and B correspond to the Earth's gravity and the Earth's magnetic field, respectively. The Earth's magnetic field and gravity are assumed to form two stationary vectors. Using a magnetometer and an accelerometer, B and G may be measured. For example, the magnetic field vector B 501 and acceleration vector G 502 may be measured. When the human interface device 200 is rotated, and then held stationary, B and G are measured again. In particular, the magnetic field vector B 503 and the acceleration vector G 504 may be measured. Given an unchanging relationship between B and G, the rotational operation that rotates B 501 and G 502 to B 503 and G 504, respectively, can be calculated. This rotation operation is the relative attitude/heading change.

Before continuing with the discussion, it is instructive to define two terms: body frame and the Earth frame. The body frame is the coordinate system in which B and G are measured with respect to a fixed point on the human interface device 200. The diagram 500 in FIG. 11 illustrates the effect of a rotation of the human interface device 200 as observed from the body frame. As the human interface device 200 is held with one end or point of the human interface device 200 at a fixed position, rotation of the human interface device 200 causes B and G to move with respect to the body frame.

The Earth frame is the coordinate system in which B and G are measured with respect to a fixed point on the surface of the Earth. The Earth frame is typically the frame of reference for the user 103 of the human interface device 200. When the user 103 moves the human interface device 200, the user 103 typically thinks about the motion relative to the Earth frame.

Thus, the solution to the attitude of the human interface device 200 can be formulated as follows: given two measurements of two constant vectors taken with respect to a body frame (of the human interface device 200) that has undergone a rotation, solve for the rotation of the human interface device 200 in the Earth frame.

There are a number of techniques can determine the attitude of the human interface device 200. As discussed above, TRIAD is one such technique. Note that the following calculations may be formulated using Quaternion-based arithmetic to avoid issues with singularity associated with the TRIAD technique. The TRIAD technique operates as follows.

Given $w_1$ and $w_2$, which represent measurements (observations) of the B and G vectors in the body frame, the following are defined:

$$r_1 = \frac{w_1}{|w_1|} \quad (1)$$

$$r_2 = \frac{r_1 \times w_2}{|r_1 \times w_2|} \quad (2)$$

$$r_3 = r_1 \times r_2 \quad (3)$$

where, $r_1$ is the normalized column vector $w_1$, $r_2$ is a normalized column vector orthogonal to $r_1$ and $w_2$, and $r_3$ is a normalized column vector orthogonal to $r_1$ and $r_2$.

Correspondingly, B and G are also known in the Earth frame. However these measurements are known a-priori; that is, they do not need to be measured and may be calculated from well-known theoretical models of the earth. For example, the magnitude and direction of the earth's magnetic and gravitational fields in San Jose, Calif. can be calculated without making new measurements. Thus the measurements in the body frame may be compared relative to these known vectors. If we call the vectors representing B and G in the Earth frame $v_1$ and $v_2$, then we may define:

$$s_1 = \frac{v_1}{|v_1|} \quad (4)$$

$$s_2 = \frac{s_1 \times v_2}{|s_1 \times v_2|} \quad (5)$$

$$s_3 = s_1 \times s_2 \quad (6)$$

where $s_1$ is the normalized column vector $v_1$, $s_2$ is a normalized column vector orthogonal to $s_1$ and $v_2$, and $s_3$ is a normalized column vector orthogonal to $s_1$ and $s_2$.

Using the normalized column vectors defined above, the attitude matrix (A) that gives the rotational transform (e.g., for generating an uncorrected attitude of the human interface device 200) in the Earth frame is:

$$A = R \cdot S^T \quad (7)$$

where $R=[r_1|r_2|r_3]$ (e.g., a matrix comprised of the three column vectors $r_1$, $r_2$, and $r_3$), $S=[s_1|s_2|s_3]$ (e.g., a matrix comprised of the three column vectors $s_1$, $s_2$, and $s_3$), and the "T" superscript denotes the transpose of the matrix to which it is applied.

Applying to the problem at hand, if $v_1$ and $v_2$ are given as the B and G vectors in the Earth frame and $w_1$ and $w_2$ are inferred from measurements produced by the multi-dimensional accelerometers 201-202 and the multi-dimensional magnetometer 203, the TRIAD technique may be used to compute the uncorrected attitude A of the human interface device 200.

Figure 12:
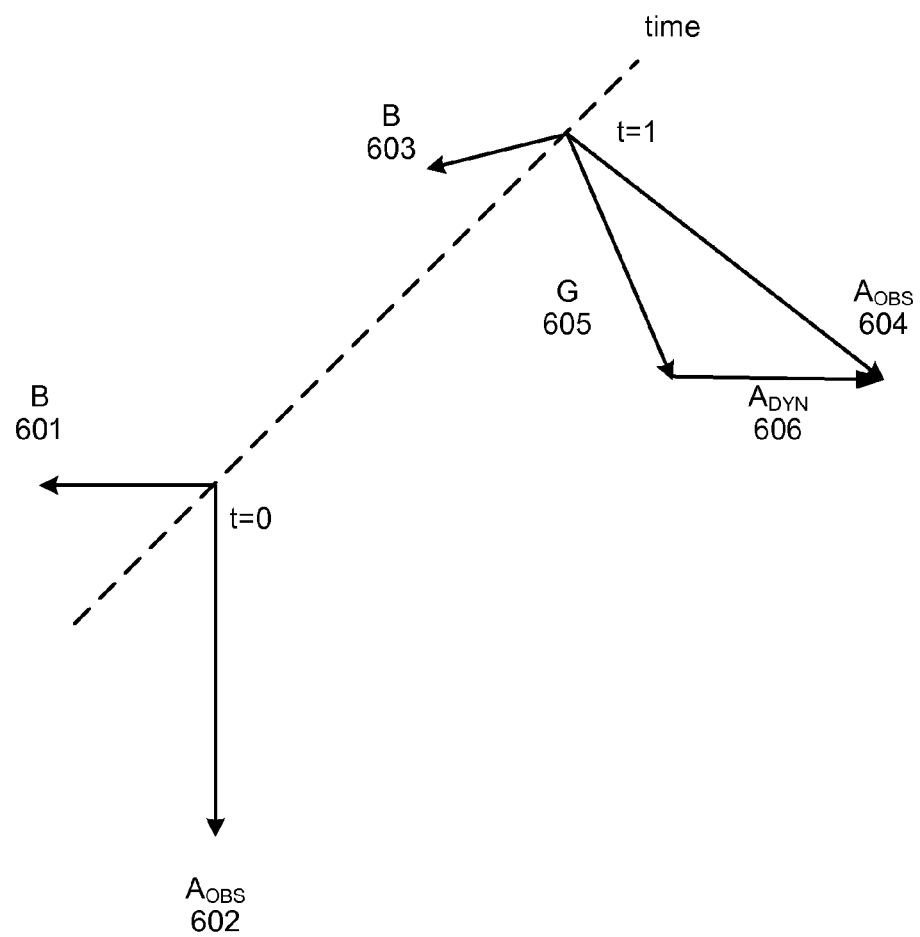
FIG. 12 is a diagram illustrating an attitude determination error caused at least in part by dynamic acceleration, according to some embodiments.

As discussed above, the accuracy of the relative heading/attitude of the human interface device 200 determined by the TRIAD technique is predicated on the assumption that the device is not subject to dynamic acceleration. This assumption does not hold true in applications, in which the user 103 makes continuous movements and/or gestures with the human interface device 200. FIG. 12 is a diagram 600 illustrating an attitude determination error caused at least in part by dynamic acceleration. At t=0, an acceleration measurement $A_{OBS}$ 602 (i.e., Earth's gravity G) and a magnetic field measurement B 601 are measured. As the human interface device 200 is rotated at t=1, an acceleration $A_{DYN}$ 606 is induced on the human interface device 200 so that the vector combination of Earth's gravity G 605 and $A_{DYN}$ 606 produce an acceleration measurement $A_{OBS}$ 604 in the body frame. Thus, the acceleration measurement $A_{OBS}$ 604 does not measure G 605. Instead, it includes the error induced by $A_{DYN}$ 606. Note that a magnetic field measurement B 603 is also measured in the body frame at t=1. Accordingly, an attitude calculation using $A_{OBS}$ 604 and B 603 would include error due to the dynamic acceleration. Thus, the TRIAD technique introduces an error to the computed attitude proportionate to the size of $A_{DYN}$ 606.

Figure 13:
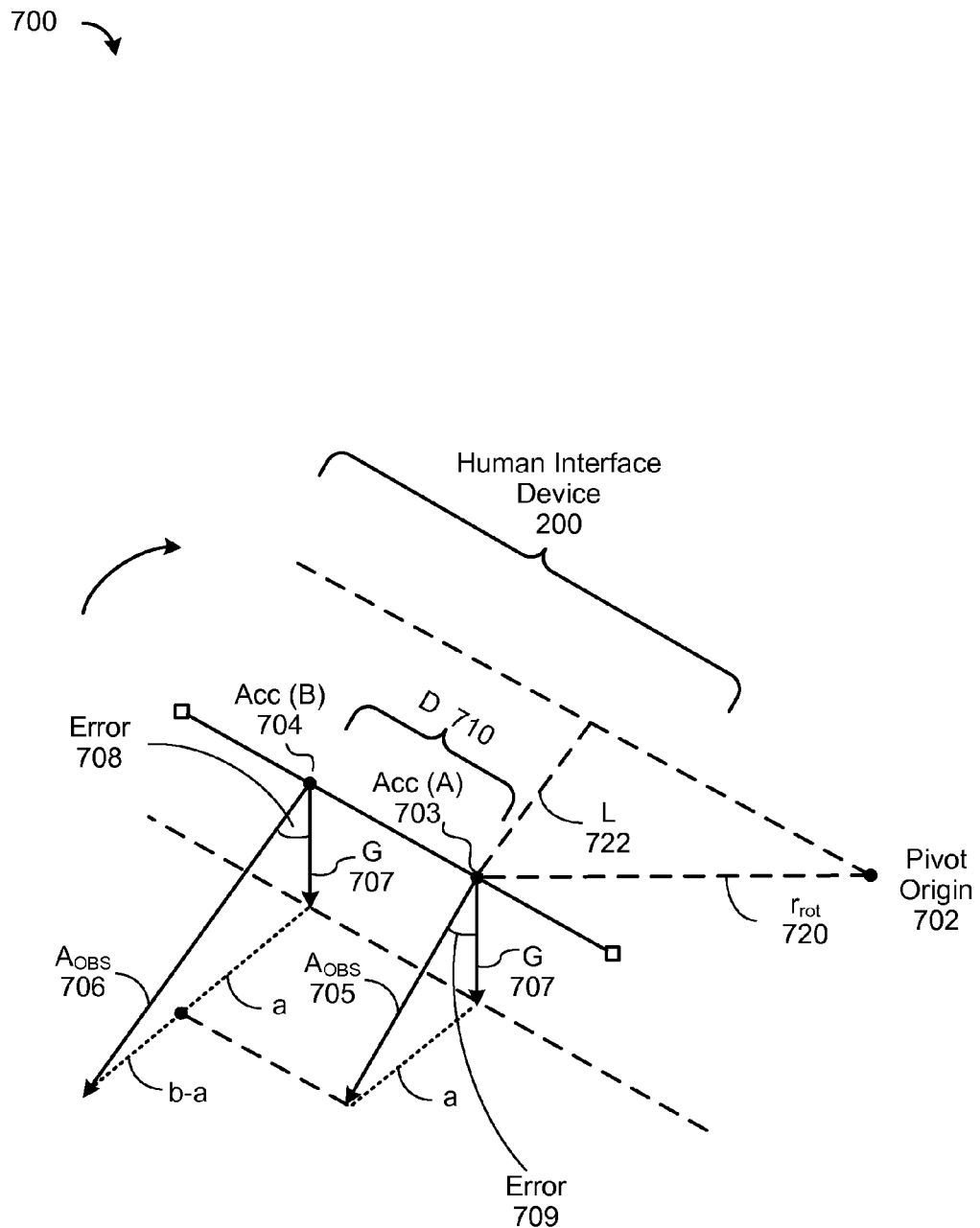
FIG. 13 is a diagram illustrating an exemplary technique for compensating for dynamic acceleration in attitude calculations, according to some embodiments.

In order to solve the aforementioned problems, some embodiments include two or more accelerometers to measure the dynamic acceleration that the human interface device 200 experiences. FIG. 13 is a diagram 700 illustrating an exemplary technique for compensating for dynamic acceleration in attitude calculations of a human interface device 200, according to some embodiments. The human interface device 200 includes multi-dimensional accelerometers 703 (A) and 704 (B) separated by a distance D 710. Furthermore, the distance from a pivot origin 702 to the multi-dimensional accelerometer 703 (A) is equal to $r_{rot}$ 720. The pivot origin 702 may be offset from the axis formed by the multi-dimensional accelerometers 703 (A) and 704 (B) by a distance L 722. For example, the distance L 722 may represent the offset between the axis of the multi-dimensional accelerometers 703 (A) and 704 (B) and a wrist of the user 103 as the human interface device 200 is held in the hand of the user 103.

Dynamic acceleration experienced the human interface device 200 may include translational acceleration imparted by lateral movement of the human interface device 200 and rotational acceleration. When the human interface device 200 is affected by translational acceleration, both multi-dimensional accelerometers 703-704 experience the same dynamic acceleration. When the device is affected by angular acceleration, the multi-dimensional accelerometers 703-704 experience dynamic acceleration proportional to their distance from the pivot origin 702.

For example, consider the case when the human interface device 200 is pivoted about the pivot origin 702, causing the multi-dimensional accelerometers 703 and 704 to produce composite acceleration measurements $A_{OBS}$ 705 and $A_{OBS}$ 706. The composite acceleration measurement $A_{OBS}$ 705 is a vector sum of the acceleration caused by Earth's gravity (G 707) and the dynamic acceleration a experienced by the first multi-dimensional accelerometer 703 (A). The composite acceleration measurement $A_{OBS}$ 706 is a vector sum of the acceleration caused by Earth's gravity (G 707) and the dynamic acceleration b experienced by the second multi-dimensional accelerometer 704 (B). Note that since the multi-dimensional accelerometer 704 is farther from the pivot origin 702 than the multi-dimensional accelerometer 703, the acceleration due to the rotation about the pivot origin 702 is greater at the second multi-dimensional accelerometer 704 (B) than at the first multi-dimensional accelerometer 703 (A). $A_{OBS}$ 705 and $A_{OBS}$ 706 include errors 708 and 709, respectively.

The change in the attitude of the human interface device 200 may be computed using measurements from both of the two multi-dimensional accelerometers 703-704. When the dynamic acceleration is entirely translational, the difference between the two computed attitudes is zero. In some embodiments, only rotational movement is translated into cursor movements. Thus, translational displacements do not result in translational cursor movement because purely translational movements do not affect yaw, pitch or roll. However, when the dynamic acceleration includes rotational components, the difference between the two accelerometer measurements produced by the two multi-dimensional accelerometers 703-704 is used to substantially reduce the error in the calculated attitude of the human interface device 200 that is caused by dynamic acceleration, thereby creating a more accurate and efficient human interface device.

Determining Attitude Using a Kalman Filter

In some embodiments, the attitude of a human interface device (e.g., the human interface device 200 in FIG. 8, etc.) is determined by using a Kalman filter. Specifically, the Kalman filter may be an extended Kalman filter. Note that this specification uses the term "Kalman filter" to refer to an "extended Kalman filter".

Figure 14:
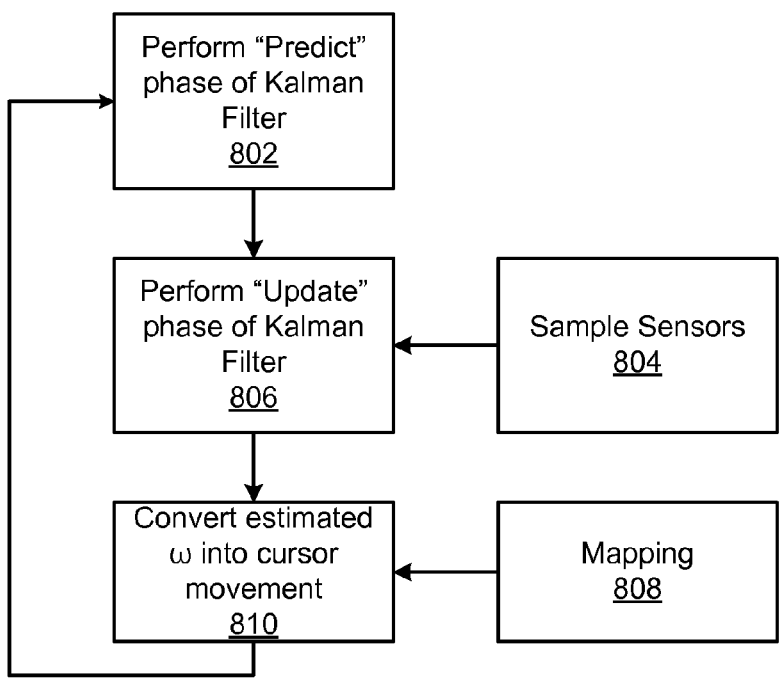
FIG. 14 is a block diagram illustrating an exemplary method for determining an attitude of a device undergoing dynamic acceleration, according to some embodiments.
Figure 15:
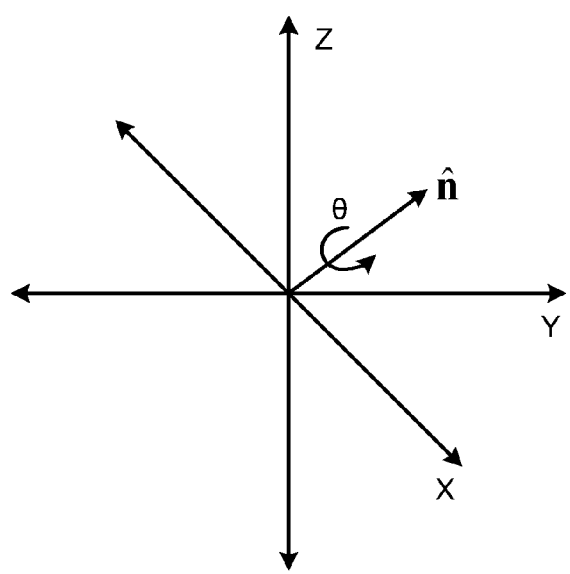
FIG. 15 is a graph illustrating an exemplary quaternion, according to some embodiments.

Attention is now directed to FIG. 14, which is a block diagram illustrating an exemplary method 800 for determining an attitude of a device undergoing dynamic acceleration, according to some embodiments. The Kalman filter generally includes two phases: a "predict" phase and an "update" phase. In the predict phase (802), an estimated state of the Kalman filter (which can also be considered to be a state of the device) from the previous timestep is used to produce a predicted estimate of the state (e.g., a "predicted state") at a current timestep. Timesteps are sometimes called update periods or sampling periods. It should be understood that the epochs described in greater detail above in the discussion of user interface state error compensation typically include one or more of these timesteps (e.g., an error compensation epoch is an integer multiple of the timesteps). In the update phase (806), measurements (e.g., the acceleration measurements 204-205, the magnetic field measurement 206, etc.) sampled (804) from the sensors of the human interface device (e.g., the multi-dimensional accelerometers 201-202, the multi-dimensional magnetometer 203, etc.) are used to correct the predicted state at the current timestep to produce an "updated state" (e.g., the estimated state that is used in the next time step). A mapping (808) is applied to the body rotation rate ω (e.g., obtained from the state vector of the Kalman filter) to convert (810) ω into the cursor motion. After determining the attitude of the human interface device, the method then returns to the "predict phase" (802) at the next timestep. In some embodiments, the repeat rate of the method ranges from as slow as twenty times per second to as high as about 200 times per second, corresponding to timesteps ranging from as large as 50 milliseconds to as small as about 5 millisecond.

In some embodiments, during the predict phase, a predicted state $\hat{x}$ and a predicted error covariance matrix P are determined as follows:

$$\hat{x}(t_{k+1}) = \int_{t_k}^{t_{k+1}} f(x, u, t) dt \quad (8)$$

$$P_k(t_{k+1}) = \Phi[P_k(t_k) + Q(t_k)]\Phi^{-1} \quad (9)$$

where $\hat{x}(t_{k+1})$ is the predicted state of the Kalman filter at timestep k+1, $f(x,u,t)$ are the dynamics of the system (defined below), x is the state, u is a control input (e.g., accelerations due to the arm of the user 103), t is time, $P_k(t_k)$ is the predicted error covariance matrix at timestep k, $P_k(t_{k+1})$ is the predicted error covariance matrix at timestep k+1, $Q(t_k)$ is an approximation of the process noise matrix at timestep k, and Φ is a state transition matrix, which is obtained from the system dynamics.

The state transition matrix, Φ, is nominally an identity matrix (i.e., ones on the diagonal) for those states that do not have a dynamics model. A dynamics model is a model of the underlying dynamic system. For example, the dynamics model for a body in motion may include Newton's equations of motion. In some embodiments, the dynamics model for attitude determination is defined by Equations (15)-(21) below. In some embodiments, only the quaternion representing the attitude of the human interface device and the vector including values representing the body rotation rate are associated with dynamic models. Thus, the only non-zero off-diagonal elements of the state transition matrix Φ are the portions of the state transition matrix that correspond to the covariances of the quaternion and body rotation rate states. Numerical values for this portion of the state transition matrix may be calculated for each timestep using a finite difference scheme instead of calculation of the dynamic system's Jacobian matrix. (Note that finding and integrating the Jacobian is the traditional technique of computing the state transition matrix.) In this finite difference scheme, a set of perturbed state vectors at time $t_k$, as well as the unperturbed state, are propagated through the dynamics model (e.g., represented by equations (15)-(21) below). Each perturbed state vector is perturbed in a single state. The differences between the propagated perturbed state and the propagated unperturbed state are calculated. The difference vectors are divided by size of the initial perturbation. These difference vectors make up the dynamic portion of the state transition matrix.

In some embodiments, the process noise matrix, Q, only includes values on the diagonal elements of the matrix.

In some embodiments, the state of the Kalman filter includes a state vector defined as follows:

$$\hat{x} = \begin{bmatrix} \vec{q} \\ \vec{\omega} \\ r_{rot} \\ a_{Yd} \\ a_{Zd} \end{bmatrix} \quad (10)$$

where $\vec{q}$ is a vector including values of a quaternion representing the attitude of the human interface device, $\vec{\omega}$ is a vector including values representing the body rotation rate (e.g., the rate at which the attitude of the human interface device is rotating), $r_{rot}$ is a vector including a value that represents the radius of rotation between one of the multi-dimensional accelerometers (e.g., the multi-dimensional accelerometer 703 (A)) and the pivot origin (e.g., the pivot origin 702), $a_{Yd}$ and $a_{Zd}$ are the bias values in the Y and Z directions of the difference between the two accelerometer measurements (e.g., the accelerometer measurements 204-205). In some embodiments, the bias of the multi-dimensional magnetometer is estimated using a separate Kalman filter.

Before continuing with the discussion of the Kalman filter, it is instructive to discuss the quaternion $\vec{q}$ representing the attitude of the human interface device. FIG. 15 is a graph illustrating an exemplary quaternion 900, according to some embodiments. Any rotation (e.g., from one frame of reference to another, or from one attitude of a device to another) may be represented by a three-dimensional unit vector n̂ having components $n_x$, $n_y$, and $n_z$, and an angle $\theta$, which is the rotation about the unit vector n̂. The rotation may be expressed as a normalized four-dimensional quaternion $\vec{q}$ having the components $q_1$, $q_2$, $q_3$, and $q_4$ as follows:

$$q_1 = n_x \sin\frac{\theta}{2} \quad (11)$$

$$q_2 = n_y \sin\frac{\theta}{2} \quad (12)$$

$$q_3 = n_z \sin\frac{\theta}{2} \quad (13)$$

$$q_4 = \cos\frac{\theta}{2} \quad (14)$$

Returning to the discussion of the Kalman filter, in some embodiments, the function $f(x,u,t)$ represents the equations of motion. For example, the equations of motion may be:

$$\dot{\vec{q}} = [\tilde{\omega}]\vec{q} \quad (15)$$

$$\dot{\vec{\omega}} = h(\vec{a}_{diff}, \vec{\omega}) \quad (16)$$

$$[\tilde{\omega}] = \frac{1}{2}\begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & \omega_x & 0 \end{bmatrix} \quad (17)$$

where $\dot{\vec{q}}$ is the first time derivative of the quaternion $\vec{q}$ representing the attitude of the human interface device, $\omega$ (e.g., see Equation (17), where the components $\omega_x$, $\omega_y$, and $\omega_z$ are the x, y, and z components of $\vec{w}$) is the linear mapping of the body rates that when multiplied by quaternion state yields the time rate of change of the quaternion state, $\dot{\vec{\omega}}$ is the angular acceleration (e.g., first time derivative of the body rotation rate) of the human interface device, $h(\vec{a}_{diff}, \vec{\omega})$ is a function of the vector representing the difference between the two accelerometer measurements ($\vec{a}_{diff}$) and the body rotation rate vector ($\vec{\omega}$). $h(\vec{a}_{diff}, \vec{\omega})$ is defined below.

Each multi-dimensional accelerometer measures a composite (e.g., vector sum) of the following accelerations/forces: tangential, centripetal, gravitational (as measured in the body frame of the accelerometer), and translational. These acceleration components may be represented as follows:

$$\vec{a}_A = -\vec{\omega} \times \vec{r}_A - \vec{\omega} \times \vec{\omega} \times \vec{r}_A + DCM(\vec{q})\vec{g} + \vec{a}_{translational} \quad (18)$$

$$\vec{a}_B = -\vec{\omega} \times \vec{r}_B - \vec{\omega} \times \vec{\omega} \times \vec{r}_B + DCM(\vec{q})\vec{g} + \vec{a}_{translational} \quad (19)$$

where $\vec{a}_A$ and $\vec{a}_B$ are the composite accelerations measurements (e.g., the acceleration measurements 204-205) for each of the two accelerometers (e.g., the multi-dimensional accelerometers 201-202) of the human interface device, $\vec{\omega}$ is the rate of change of the body rotation rate $\vec{\omega}$, $\vec{r}_A$ and $\vec{r}_B$ are the radius of rotations of each of the two accelerometers relative to a pivot origin, $DCM(\vec{q})$ is the direction cosine matrix (DCM) that is obtained from the quaternion $\vec{q}$ representing the attitude of the human interface device (e.g., the $\vec{q}$ is converted to a DCM so that it can operate on the gravity vector $\vec{g}$), $\vec{g}$ is the acceleration due to gravity as viewed from the body frame (e.g., the frame of the accelerometer), and $\vec{a}_{translational}$ is the translational acceleration.

Note that the Kalman state described above only includes a state value representing the radius of rotation, $r_{rot}$, to one of the accelerometers (e.g., the multi-dimensional accelerometer 703 (A)). If the offset (e.g., L 722, FIG. 13 between the pivot origin (e.g., the pivot origin 702) and the axis of the accelerometers (e.g., the multi-dimensional accelerometers 703-704) are collinear (e.g., L 722 is zero), the magnitude of $\vec{r}_B$ is $r_{rot}$ (e.g., $r_{rot}$ 720) plus the distance between the accelerometers (e.g., D 710, which is a known quantity). If the offset between the pivot origin and the axis of the accelerometers is non-zero, $\vec{r}_B$ may be calculated from the geometric relationship between, $\vec{r}_A$, D 710, $r_{rot}$, and the offset (e.g., by using the Pythagorean Theorem, etc.), where $r_{rot}$ and the offset are states of the Kalman filter.

A vector difference $\vec{a}_{diff}$ between $\vec{a}_A$ and $\vec{a}_B$ yields:

$$\vec{a}_{diff} = \vec{a}_B - \vec{a}_A = -\vec{\omega} \times \vec{r}_{diff} - \vec{\omega} \times \vec{\omega} \times \vec{r}_{diff} \quad (20)$$

where, $\vec{r}_{diff}$ is the vector difference between $\vec{r}_A$ and $\vec{r}_B$ (e.g., $\vec{r}_{diff} = \vec{r}_B - \vec{r}_A$). Note that $\vec{a}_{diff}$ does not include the acceleration forces due to gravity and translation.

Equation (20) may be rearranged to solve for the angular acceleration $\dot{\vec{\omega}}$:

$$\dot{\vec{\omega}}\Big|_{\dot{\vec{\omega}}\cdot\vec{r}_{diff}=0} = \frac{1}{|\vec{r}_{diff}|^2}[\vec{a}_{diff} + \vec{\omega} \times \vec{\omega} \times \vec{r}_{diff}] \times \vec{r}_{diff} \quad (21)$$

where $\dot{\vec{\omega}}$ is evaluated at $\dot{\vec{\omega}} \cdot \vec{r}_{diff} = 0$ (e.g., when the only non-zero components of the angular acceleration $\dot{\vec{\omega}}$, are orthogonal to the vector $\vec{r}_{diff}$, which is defined in the preceding paragraph). Equation (21) is then used in Equation (16). Note that $a_{diff}$ is a measurement (e.g., from the multi-dimensional accelerometers), $\omega$ is obtained from state vector, and $\vec{r}_{diff}$ is the vector difference between $\vec{r}_A$ and $\vec{r}_B$, as explained above.

In some embodiments, the number of states in the error covariance matrix P is reduced by expressing the variation of the quaternion state as orthogonal modified Rodrigues parameters (MRPs), which have three (3) parameters as compared to four (4) parameters in a quaternion. The MRP and the quaternion contain the same rotation information, but the redundant parameter in the quaternion avoids singularities. In these embodiments, the update of the quaternion state is estimated as an MRP rotation, and then converted to a quaternion. The update of the quaternion state is applied multiplicatively and preserves the unit norm property of the quaternion.

During the update phase, the predicted state matrix and predicted error covariance matrix are updated based on the sensor measurement as follows:

$$\hat{x}_{k+1}(t_k) = \hat{x}(t_{k+1}) + K_k(\vec{y}_m - \hat{y}) \quad (22)$$

$$P_{k+1}(t_k) = (I - K_k G_k)P_k(t_k) \quad (23)$$

where $\hat{x}_{k+1}(t_k)$ is the updated state vector at timestep k+1, $\hat{x}(t_{k+1})$ is the predicted state vector at timestep k that was calculated in the predict phase, $K_k$ is the Kalman gain, $\vec{y}_m$ is the observed measurements (e.g., the sensor measurements), $\hat{y}$ is the predicted sensor measurements (e.g., the predicted sensor measurements that are obtained from the predicted state vector and the sensor models described in equations (28) and (29) below), I is the identity matrix, and $G_k$ is an observation transformation matrix that maps the deviations from the state vector to deviations from the observed measurements (e.g., the sensor measurements). Note that the term $\vec{y}_m - \hat{y}$ is referred to as a residual.

Generally, $\hat{y}$ is a function of the state vector, the first time derivative of the state vector, and time (e.g., $\hat{y} = g(\vec{x}, \dot{\vec{x}}, t)$), and may be determined using the sensor models described below. The Kalman gain $K_k$ may be determined using the following equations:

$$K_k = P_k G_k^T S^{-1} \quad (24)$$

$$S_k = G_k P_k G_k^T + R \quad (25)$$

$$G_k = \frac{\partial \hat{y}}{\partial \vec{x}} \quad (26)$$

where R is the measurement covariance matrix.

In some embodiments, $\vec{y}_m$ includes the following components:

$$\vec{y}_m = \begin{bmatrix} \vec{H}_{xy} \\ \vec{a}_A \\ \vec{a}_B \end{bmatrix} \quad (27)$$

where $\vec{H}_{xy}$ is the directional residual of the magnetic field measurement (e.g., the magnetic field measurement 206), $\vec{a}_A$ is the accelerometer measurement (e.g., the accelerometer measurement 205) from a first multi-dimensional accelerometer (e.g., the multi-dimensional accelerometer 202), and $\vec{a}_B$ is the accelerometer measurement (e.g., the accelerometer measurement 204) from a second multi-dimensional accelerometer (e.g., the multi-dimensional accelerometer 201). Note that the directional residual of the magnetic field measurement, $\vec{H}_{xy}$, may be used because when determining the attitude of a human interface device, only the directional information is required; the magnitude of the magnetic field is not used. In fact, in these embodiments, attempting to correct/update the magnitude of the magnetic field in the Kalman filter state causes the Kalman filter state to diverge. $\vec{H}_{xy}$ may be calculated from the magnetic field measurement using the technique described in "Spinning Spacecraft Attitude Estimation Using Markley Variables: Filter Implementation and Results" (Joseph E. Sedlak, 2005, available at http://ntrs.nasa.gov/archive/nasa/casi.ntrs.nasa.gov/20050243414.pdf), which is hereby incorporated by reference in its entirety.

In some embodiments, the sensor model for the multi-dimensional magnetometer and the multi-dimensional accelerometers are:

$$\hat{H}_{xy} = [R_{Bzenith}][\text{DCM}(\hat{q}(t_{k+1}))]\vec{H}_{ref} \quad (28)$$

$$\hat{a} = -\vec{\omega} \times \vec{r}_{Acc} - \hat{\omega}(t_{k+1}) \times \hat{\omega}(t_{k+1}) \times \vec{r}_{Acc} + \text{DCM}(\vec{q}(t_{k+1}))\vec{g} \quad (29)$$

where $\hat{H}_{xy}$ is the two-dimensional directional residual between the measured and estimated magnetometer values, $R_{Bzenith}$ is a rotation matrix that rotates the magnetic field measurement to the Z-axis vector in the new frame of reference (e.g., the frame of reference described in "Spinning Spacecraft Attitude Estimation Using Markley Variables: Filter Implementation and Results," whereby the directional variances of a three dimensional vector are expressed as two variables), $\text{DCM}(\hat{q}(t_{k+1}))$ is the DCM that is obtained from the quaternion $\hat{q}$ representing the estimated attitude of the human interface device (e.g., the $\hat{q}$ is converted to a DCM so that it can operate on the gravity vector $\vec{g}$ and/or $\vec{H}_{ref}$), $\vec{H}_{ref}$ is the assumed magnetic field measurement in the Earth frame, and $\vec{r}_{Acc}$ is the radius of rotation for a respective accelerometer, relative to the pivot point. The angular acceleration $\vec{\omega}$ may be obtained from the difference of the accelerometer measurements (e.g., Equation (21)) and acts as a "pass-through" variable for the sensor measurements In some embodiments, the state vector $\hat{x}$ is a 10×1 matrix, the error covariance matrix P is a 9×9 matrix, and the observation partial derivative matrix G is an 8×9 matrix. In these embodiments, $\vec{q}$ is a 4×1 vector, $\vec{\omega}$ a 3×1 vector, $r_{rot}$ is a 1×1 vector, and $a_{Yd}$ and $a_{Zd}$ are each 1×1 vectors. These components of the state vector $\hat{x}$ together form a 10×1 matrix.

Accelerometer quantization may cause the attitude determined by the Kalman filter to incorrectly indicate that the human interface device is moving when it is not. If left uncorrected, accelerometer quantization may significantly degrade performance of the system in which the human interface device is used (e.g., the cursor on the host system may drift across the user interface). Thus, in some embodiments, for small values of the accelerometer measurements (e.g., values below twenty times the quantization interval), the techniques described in "Covariance Profiling for an Adaptive Kalman Filter to Suppress Sensor Quantization Effects" by D. Luong-Van et al. (43rd IEEE Conference on Decision and Control, Volume 3, pp. 2680-2685, 14-17 Dec. 2004), which is hereby incorporated by reference in its entirety, are used to mitigate the effects of the quantized data measurements reported by the accelerometers.

Furthermore, accelerometer noise may cause jitter causing the attitude determined by the Kalman filter to indicate that the human interface device is moving even when the human interface device at rest. Thus, in some embodiments, a deadband is used for values of the accelerometer measurements that occur in a specified range of quantization levels of the accelerometer measurements. For example, the specified range may be between two and twenty times the quantization level of the accelerometers. Note that it is desirable to minimize the deadband, but this minimization must be balanced against the device performance at low angular rates and accelerations where quantization effects will dominate the behavior of the pointer.

Adaptive Kalman Gain

As discussed above, substantial error can arise in the calculation of the attitude of a human interface device that is undergoing dynamic acceleration. These errors arise from the inability of a single multi-dimensional accelerometer to distinguish between the effects of dynamic acceleration and the actual gravity vector. To compensate for this, in some embodiments, the acceleration measurements from the accelerometers are given less weight when the human interface device is undergoing dynamic acceleration than when the human interface device is not undergoing dynamic acceleration.

The weight of the acceleration measurements in the Kalman filter may be controlled by the Kalman gain ($K_k$). Thus, in some embodiments, the Kalman gain is adjusted based on the amount of dynamic acceleration experienced by the human interface device. For example, the Kalman gain may be adjusted through the measurement covariance matrix R (see equations 24 and 25, above).

Figure 16:
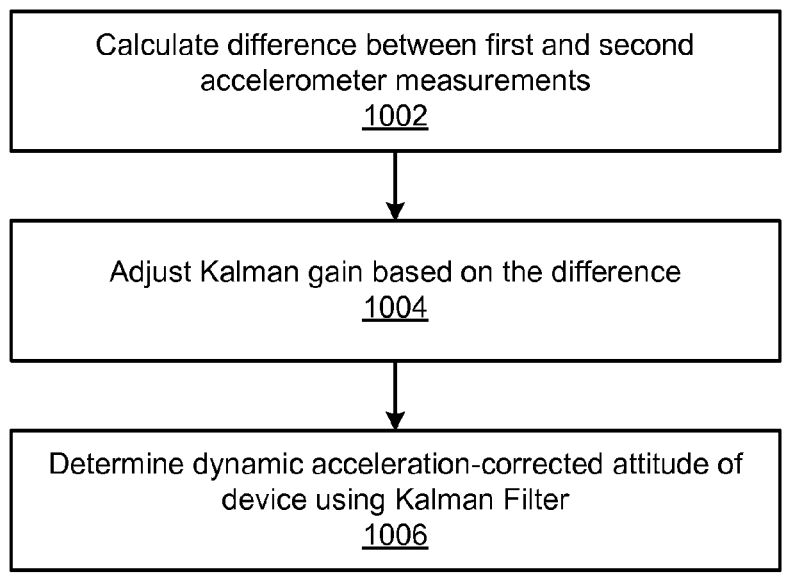
FIG. 16 is a flow diagram of a method for determining an attitude of a device undergoing dynamic acceleration, according to some embodiments.

Attention is now directed to FIG. 16, which is a flow diagram of a method 1000 for determining an attitude of a device undergoing dynamic acceleration, according to some embodiments. A difference between a first accelerometer measurement received from a first multi-dimensional accelerometer of the device and a second accelerometer measurement received from a second multi-dimensional accelerometer of the device is calculated (1002) (e.g., see Equation (20)).

A Kalman gain based on the difference is adjusted (1004), wherein the Kalman gain is used in a Kalman filter that determines the attitude of the device. When the difference is less than a specified threshold, values associated with the first accelerometer measurement and the second accelerometer measurement in a measurement covariance matrix of the Kalman filter (e.g., R) are decreased so that the first accelerometer measurement and the second accelerometer measurement are given more weight in the Kalman filter relative to the magnetic field measurement than when the difference is greater than the specified threshold. When the difference is greater than a specified threshold, covariance values associated with the first accelerometer measurement and the second accelerometer measurement in a measurement covariance matrix of the Kalman filter (e.g., R) are increased so that the first accelerometer measurement and the second accelerometer measurement are given less weight in the Kalman filter relative to the magnetic field measurement than when the difference is less than the specified threshold. For example, when the difference is greater than the specified threshold, the covariance values associated with the first accelerometer measurement and the second accelerometer measurement may be increased by a factor of 100 compared with their values when the difference is less than the specified threshold. This threshold may be defined as being the same differential acceleration threshold as defined for the deadband.

An attitude of the device is determined (1006) using the Kalman filter based at least in part on the Kalman gain, the first accelerometer measurement, the second accelerometer measurement, and a magnetic field measurement received from a multi-dimensional magnetometer of the device. For example, the Kalman filter described above with reference to FIG. 14 and Equations (8)-(29) may be used to determine the attitude of the device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for adjusting a displayed user interface in accordance with a navigational state of a human interface device, comprising:
   at a computer system including one or more processors and memory storing one or more programs, the one or more processors executing the one or more programs to perform the operations of:
   for each measurement epoch, performing a base set of operations comprising:
      determining an unmodified user interface state in accordance with the navigational state of the human interface device; and
      generating current user interface data enabling a current user interface to be displayed in accordance with the unmodified user interface state;
   upon detecting an error introducing state of the human interface device, the method includes for each measurement epoch, performing the base set of operations and additional operations comprising:
      determining a modified user interface state;
      adjusting the current user interface data in accordance with the modified user interface state; and
      determining a user interface state error based on a difference between the modified user interface state and the unmodified user interface state; and
   upon detecting an error compensating state of the human interface device, the method includes for each measurement epoch, performing the base set of operations and additional operations comprising:
      determining a compensation adjustment for reducing the user interface state error, wherein a magnitude of the compensation adjustment is scaled by the magnitude of a change in the unmodified user interface state between a prior measurement epoch and a current measurement epoch;
      adjusting the current user interface data in accordance with the compensation adjustment; and
      reducing the user interface state error in accordance with the compensation adjustment; and
   performing an operation using the current user interface data so as to enable the current user interface to be displayed.

2. The method of claim 1, wherein the current user interface data includes cursor position data corresponding to a cursor position in the currently displayed user interface.

3. The method of claim 2, wherein the cursor position data is selected from the group consisting of:
   data relating to a change in the cursor position between measurement epochs;
   data relating to a velocity associated with the change in the cursor position between measurement epochs;
   data relating to an absolute coordinate of the cursor position; and
   data relating to a relative coordinate of the cursor position.

4. The method of claim 1, wherein the current user interface data includes data corresponding to a location of one or more user interface objects overlaid on a dynamic background, wherein the dynamic background is a background that changes in accordance with changes in actual position and attitude of the human interface device.

5. The method of claim 1, wherein the human interface device includes a camera, and the current user interface data includes data corresponding to a location of one or more user interface objects overlaid on a dynamic background, wherein the dynamic background is an image corresponding to camera data from the camera.

6. The method of claim 1, wherein the current user interface data includes data enabling selection of a portion of a larger user interface that is to be currently displayed to a user of the human interface device.

7. The method of claim 6, wherein: the larger user interface is a virtual world and the current user interface is a portion of the virtual world that is selected based on a simulated viewpoint of the user in the virtual world.

8. The method of claim 1, wherein determining the modified user interface state includes determining the modified user interface state based on a heuristic function, wherein the heuristic function introduces a heuristic error between the unmodified user interface state and the modified user interface state.

9. The method of claim 8, wherein the heuristic function is selected from the group consisting of:
 a function that reduces jitter produced by a user when a button is pressed on the human interface device;
 a function that reduces unintended movements of the human interface device produced when the user holds the human interface device;
 a function that creates a deadband in movement of one or more elements of the user interface;
 a function that has a non-constant gain relationship between the navigational state and a position of one or more elements of the user interface; and
 a function that constrains movement of one or more elements of the user interface to a predefined path.

10. The method of claim 1, wherein adjusting the current user interface in accordance with the compensation adjustment includes:
 calculating a feedback direction associated with the user interface state error;
 calculating a feedback magnitude as a predetermined function of the magnitude of the change in the unmodified user interface state between the prior measurement epoch and the current measurement epoch; and
 adjusting the current user interface data by adding the feedback magnitude in the feedback direction to the unmodified user interface state.

11. The method of claim 1, wherein the error compensating state and the error introducing state occur concurrently.

12. The method of claim 1, wherein the base set of operations further comprises:
 acquiring one or more sensor inputs from sensors on the human interface device; and
 calculating the navigational state of the human interface device, in accordance with the acquired one or more sensor inputs, as the human interface device is moved by a user.

13. The method of claim 1, wherein the human interface device includes:
 one or more absolute sensors; and
 one or more relative sensors.

14. A system, comprising:
 one or more processors;
 memory; and
 one or more programs stored in the memory, the one or more programs comprising instructions to:
 for each measurement epoch, perform a base set of operations comprising:
  determining an unmodified user interface state in accordance with a navigational state of a human interface device; and
  generating current user interface data enabling a current user interface to be displayed in accordance with the unmodified user interface state;
 upon detecting an error introducing state of the human interface device, for each measurement epoch, perform the base set of operations and additional operations comprising:
  determining a modified user interface state;
  adjusting the current user interface data in accordance with the modified user interface state; and
  determining a user interface state error based on a difference between the modified user interface state and the unmodified user interface state;
 upon detecting an error compensating state of the human interface device, for each measurement epoch, perform the base set of operations and additional operations comprising:
  determining a compensation adjustment for reducing the user interface state error, wherein a magnitude of the compensation adjustment is scaled by the magnitude of a change in the unmodified user interface state between a prior measurement epoch and a current measurement epoch;
  adjusting the current user interface data in accordance with the compensation adjustment; and
  reducing the user interface state error in accordance with the compensation adjustment; and
 perform an operation using the current user interface data so as to enable the current user interface to be displayed.

15. The system of claim 14, wherein the current user interface data includes cursor position data corresponding to a cursor position in the currently displayed user interface.

16. The system of claim 14, wherein the current user interface data includes data corresponding to a location of one or more user interface objects overlaid on a dynamic background, wherein the dynamic background is a background that changes in accordance with changes in actual position and attitude of the human interface device.

17. The system of claim 14, wherein the human interface device includes a camera, and the current user interface data includes data corresponding to a location of one or more user interface objects overlaid on a dynamic background, wherein the dynamic background is an image corresponding to camera data from the camera.

18. The system of claim 14, wherein the current user interface data includes data enabling selection of a portion of a larger user interface that is to be currently displayed to a user of the human interface device.

19. The system of claim 14, wherein adjusting the current user interface in accordance with the compensation adjustment includes:
 calculating a feedback direction associated with the user interface state error;
 calculating a feedback magnitude as a predetermined function of the magnitude of the change in the unmodified user interface state between the prior measurement epoch and the current measurement epoch; and
 adjusting the current user interface data by adding the feedback magnitude in the feedback direction to the unmodified user interface state.

20. A non-transitory computer readable storage medium storing one or more programs configured for execution by a computer system, the one or more programs comprising instructions to:
 for each measurement epoch, perform a base set of operations comprising:

determining an unmodified user interface state in accordance with a navigational state of a human interface device; and generating current user interface data enabling a current user interface to be displayed in accordance with the unmodified user interface state;

upon detecting an error introducing state of the human interface device, for each measurement epoch, perform the base set of operations and additional operations comprising:

determining a modified user interface state;

adjusting the current user interface data in accordance with the modified user interface state; and determining a user interface state error based on a difference between the modified user interface state and the unmodified user interface state;

upon detecting an error compensating state of the human interface device, for each measurement epoch, perform the base set of operations and additional operations comprising:

determining a compensation adjustment for reducing the user interface state error, wherein a magnitude of the compensation adjustment is scaled by the magnitude of a change in the unmodified user interface state between a prior measurement epoch and a current measurement epoch;

adjusting the current user interface data in accordance with the compensation adjustment; and reducing the user interface state error in accordance with the compensation adjustment; and perform an operation using the current user interface data so as to enable the current user interface to be displayed.

21. The non-transitory computer readable storage medium of claim 20, wherein the current user interface data includes cursor position data corresponding to a cursor position in the currently displayed user interface.

22. The non-transitory computer readable storage medium of claim 20, wherein the current user interface data includes data corresponding to a location of one or more user interface objects overlaid on a dynamic background, wherein the dynamic background is a background that changes in accordance with changes in actual position and attitude of the human interface device.

23. The non-transitory computer readable storage medium of claim 20, wherein the human interface device includes a camera, and the current user interface data includes data corresponding to a location of one or more user interface objects overlaid on a dynamic background, wherein the dynamic background is an image corresponding to camera data from the camera.

24. The non-transitory computer readable storage medium of claim 20, wherein the current user interface data includes data enabling selection of a portion of a larger user interface that is to be currently displayed to a user of the human interface device.

25. The non-transitory computer readable storage medium of claim 20, wherein adjusting the current user interface in accordance with the compensation adjustment includes:

calculating a feedback direction associated with the user interface state error;

calculating a feedback magnitude as a predetermined function of the magnitude of the change in the unmodified user interface state between the prior measurement epoch and the current measurement epoch; and adjusting the current user interface data by adding the feedback magnitude in the feedback direction to the unmodified user interface state.

* * * * *